(12) United States Patent
Mindock et al.

(10) Patent No.: US 10,604,276 B2
(45) Date of Patent: Mar. 31, 2020

(54) AIRCRAFT WING-BODY SECTION SPRAY CONTAINMENT SYSTEM

(71) Applicant: The Boeing Company, Chicago, IL (US)

(72) Inventors: Nikolas Mindock, Kirkland, WA (US); Brent Kauffman, Seattle, WA (US); Agustin Lopez, III, Camano Island, WA (US); Aleksandr Polyakov, Bothell, WA (US); Jeffrey Ullerich, Edmonds, WA (US); Daniel Weinberg, Everett, WA (US)

(73) Assignee: The Boeing Company, Chicago, IL (US)

( * ) Notice: Subject to any disclaimer, the term of this patent is extended or adjusted under 35 U.S.C. 154(b) by 197 days.

(21) Appl. No.: 15/723,163

(22) Filed: Oct. 2, 2017

(65) Prior Publication Data

US 2019/0100332 A1    Apr. 4, 2019

(51) Int. Cl.

| | |
|---|---|
| *B64F 5/10* | (2017.01) |
| *B05D 1/02* | (2006.01) |
| *B05B 16/00* | (2018.01) |
| *B05B 14/30* | (2018.01) |
| *B05B 16/40* | (2018.01) |
| *B05B 16/60* | (2018.01) |
| *B05B 12/32* | (2018.01) |
| *B05B 16/80* | (2018.01) |
| *B05B 13/02* | (2006.01) |

(52) U.S. Cl.
CPC .............. *B64F 5/10* (2017.01); *B05B 12/32* (2018.02); *B05B 14/30* (2018.02); *B05B 16/00* (2018.02); *B05B 16/405* (2018.02); *B05B 16/60* (2018.02); *B05B 16/80* (2018.02); *B05D 1/02* (2013.01); *B05B 13/02* (2013.01)

(58) Field of Classification Search
None
See application file for complete search history.

(56) References Cited

U.S. PATENT DOCUMENTS

| 7,779,779 B2 * | 8/2010 | Ferguson ................ B05B 16/80 |
| | | 118/326 |
| 10,307,788 B2 * | 6/2019 | Arthur ..................... B64F 5/10 |

* cited by examiner

*Primary Examiner* — Nathan T Leong

(57) ABSTRACT

A spray containment system for a wing-body section includes a forward module, a center module, and an aft module. The forward module has a forward closeout panel configured to engage a forward end of a fuselage center section of the wing-body section. The center module has opposing module side panels each configured to engage a wing lower surface of a wing of the wing-body section. The aft module has an aft closeout panel configured to engage an aft end of the fuselage center section. The forward module and the aft module are independently movable and are configured to be assembled around the wing-body section to define an internal environment that is sealed from an external environment for containing contaminants including at least one of vapors, overspray, and liquids generated during application of one or more of coatings, sealants, and adhesives to localized areas of the wing-body section.

21 Claims, 23 Drawing Sheets

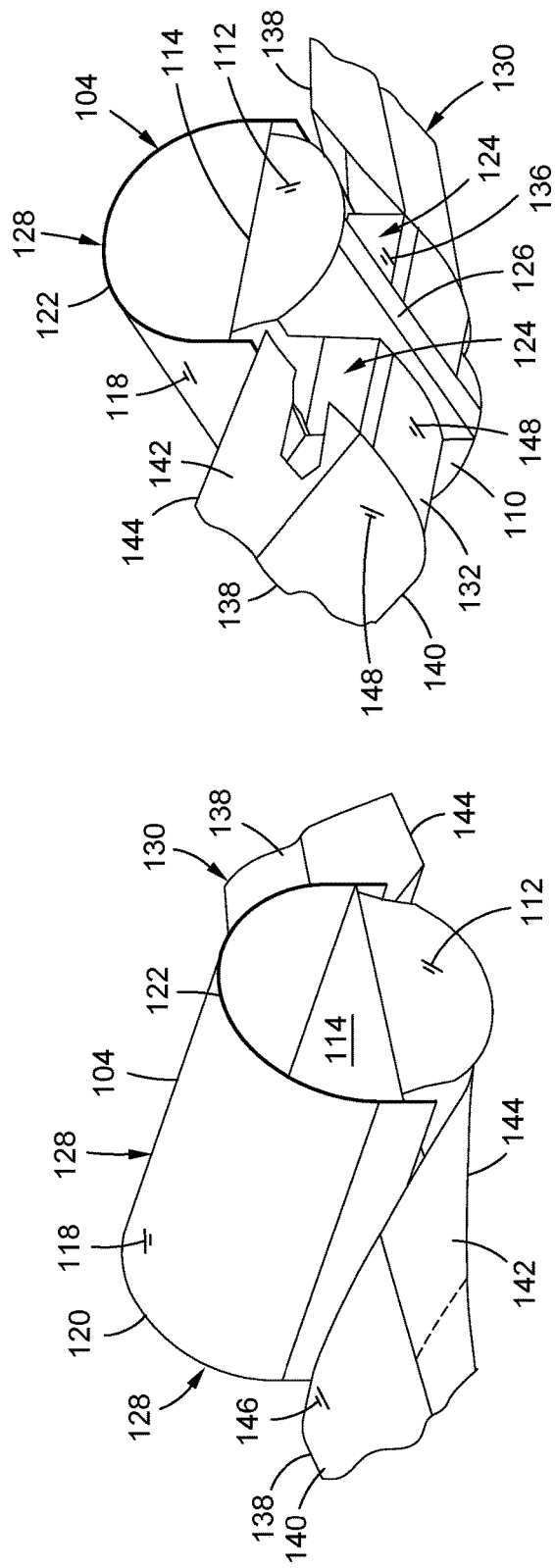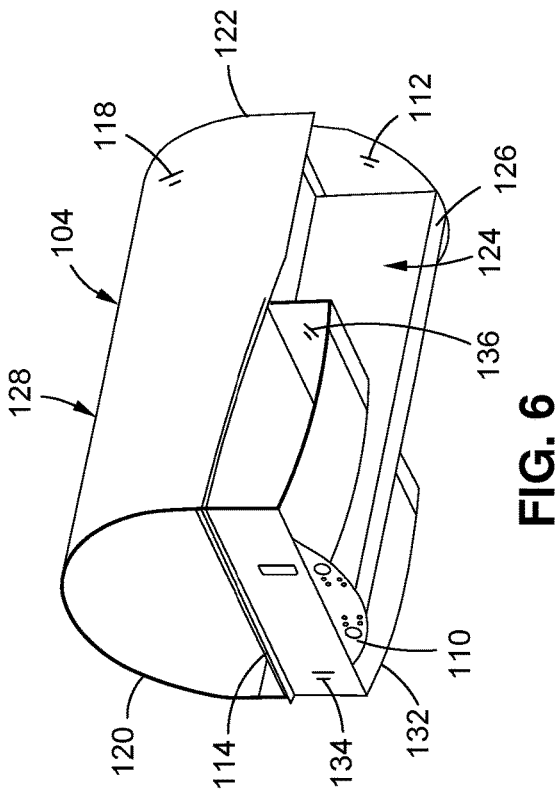

AIRCRAFT WING-BODY SECTION SPRAY CONTAINMENT SYSTEM

FIELD

The present disclosure relates generally to aircraft manufacturing and, more particularly, to a spray containment system for containing contaminants during processing of an aircraft wing-body section.

BACKGROUND

The manufacturing of an aircraft may require joining a left wing and a right wing to a central wing box, and then joining the wing box to a fuselage center section to form a wing-body section. Alternatively, a wing box and fuselage center section may be joined, after which a left wing and a right wing may be joined to the wing box to form the wing-body section. As part of the aircraft manufacturing process, protective coatings may be applied to different areas of the wing-body section during or subsequent to such assembly processes. For example, paint, fuel vapor barrier coatings, corrosion-inhibiting compounds, and/or sealants may be applied to localized areas of the aircraft, such as the fuselage interior, the wing box, and along upper and lower surfaces of the wings at the juncture with the fuselage. In a factory environment, it is necessary to contain vapors, overspray, and/or liquids resulting from the process of applying protective coatings. As a result, the wing-body section must be enclosed during the coating application process.

Conventional enclosure systems for wing-body sections are fixed structures that are permanently mounted to the factory floor. The permanent nature of such enclosure systems necessitates the use of an overhead crane to move the wing-body section into position over the enclosure system, after which the crane lowers a lid onto the enclosure system to fully enclose the wing-body section. Once the coatings have been applied and cured, the overhead crane is again required to lift the lid off of the enclosure and move the lid onto a storage tool, and move the wing-body section to the next production line position on the factory floor. The use of an overhead crane for each move of the wing-body section and lid impacts overall production rate.

As can be seen, there exists a need in the art for a system and method for enclosing a wing-body section that allows for the manufacturing of aircraft in an efficient manner.

SUMMARY

The above-noted needs associated with enclosing a wing-body section are specifically addressed and alleviated by the present disclosure which provides a spray containment system for a wing-body section of an aircraft. The wing-body section includes a wing assembly having a pair of wings joined to a fuselage center section. The spray containment system comprises a forward module, a center module, and an aft module. The forward module has a forward closeout panel configured to engage and at least partially close off a fuselage center section forward end. The center module has opposing module side panels on each of opposing sides of the center module. Each Module side panel has a panel upper edge configured to engage a wing lower surface of a wing of the wing-body section. The aft module has an aft closeout panel configured to engage and at least partially close off a fuselage center section aft end. The forward module and the aft module are independently movable and configured to be assembled around the wing-body section to define an internal environment that is sealed from an external environment for containing contaminants including vapors, overspray, and/or liquids generated during the application of one or more of coatings, sealants, and adhesives to localized areas of the wing-body section.

Also disclosed is an aircraft production line having a plurality of aircraft manufacturing line positions for pulsed manufacturing of an aircraft. The manufacturing line positions include a coating application position implementing a spray containment system for an aircraft wing-body section comprising a wing assembly including a pair of wings joined to a fuselage center section. The spray containment system includes a forward module, a center module, and an aft module configured as described above and independently movable to facilitate assembly around the wing-body section to define an internal environment that is sealed from an external environment for containing contaminants.

Additionally, disclosed is a method of containing contaminants during processing of an aircraft wing-body section having a pair of wings joined to a fuselage center section. The method includes positioning a forward module against a forward end of the aircraft wing-body section such that a forward closeout panel of the forward module is engaged to and at least partially closes off a fuselage center section forward end. In addition, the method includes providing a center module under the aircraft wing-body section such that a panel upper edge of each of opposing module side panels on each of opposing sides of the center module, are engaged to a wing lower surface respectively of the pair of wings of the wing-body section. The method also includes positioning an aft module against an aft end of the aircraft wing-body section such that an aft closeout panel is engaged to and at least partially closes off a fuselage center section aft end. The forward module, center module, and aft module are independently movable and are configured to be assembled around the wing-body section. When assembled around the wing-body section, the forward module, the center module, and the aft module in combination with the wing-body section define an internal environment that is sealed from an external environment and contains contaminants generated during the application of one or more coatings to portions of the wing-body section.

The features, functions and advantages that have been discussed can be achieved independently in various embodiments of the present disclosure or may be combined in yet other embodiments, further details of which can be seen with reference to the following description and drawings below.

BRIEF DESCRIPTION OF THE DRAWINGS

These and other features of the present disclosure will become more apparent upon reference to the drawings wherein like numbers refer to like parts throughout and wherein:

FIG. 4 is a top-down perspective view of the wing-body section illustrating a fuselage center section joined to a wing assembly comprised of a pair of wings joined by a wing box;

FIG. 5 is a bottom-up perspective view of the wing-body section of FIG. 4;

FIG. 6 is a side perspective view of the wing-body section of FIG. 4-5 with the wings omitted to illustrate the wing box joined to the fuselage center section;

DETAILED DESCRIPTION

Figure 1:
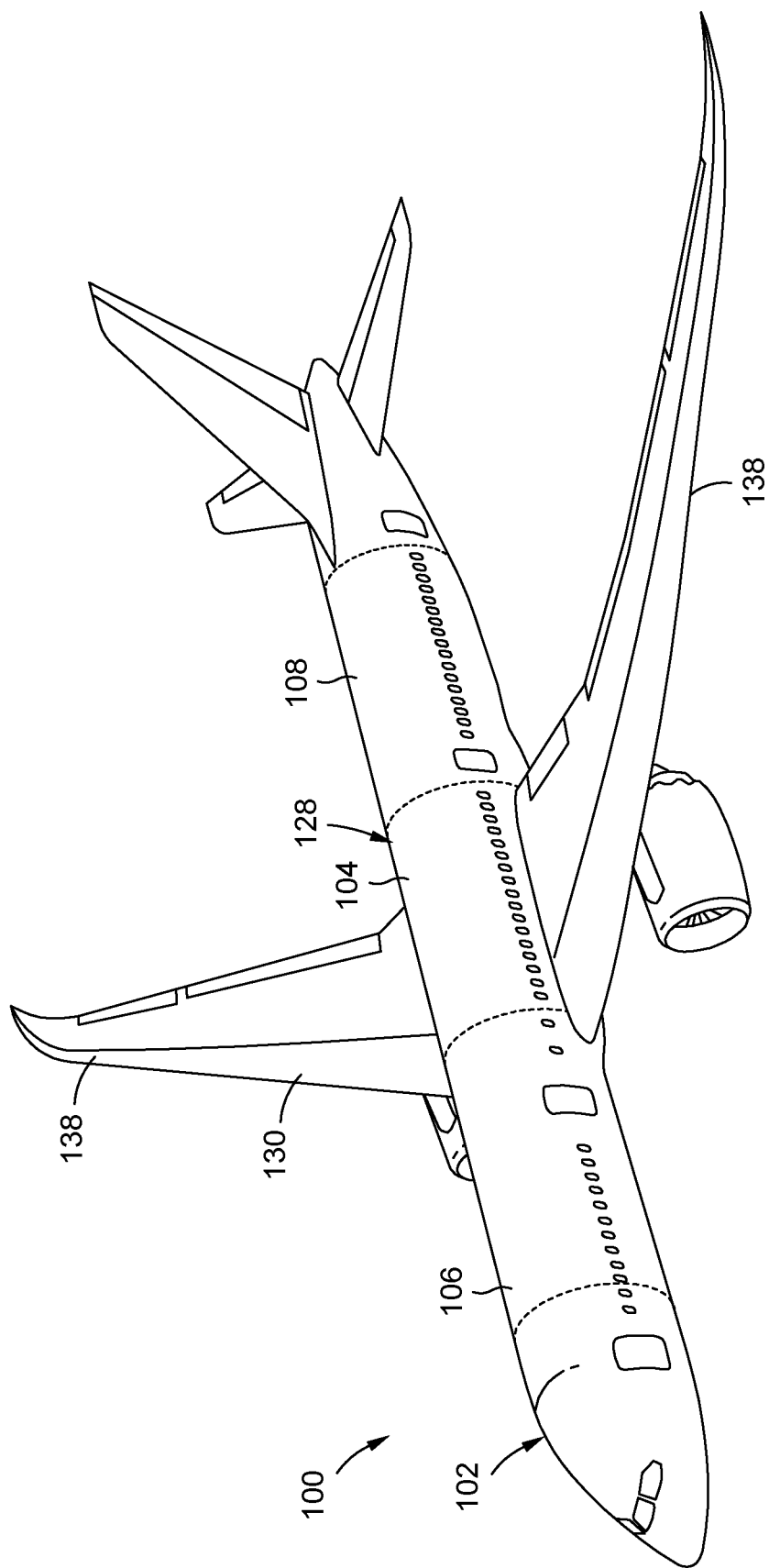
FIG. 1 is a perspective view of an aircraft.
Figure 3:
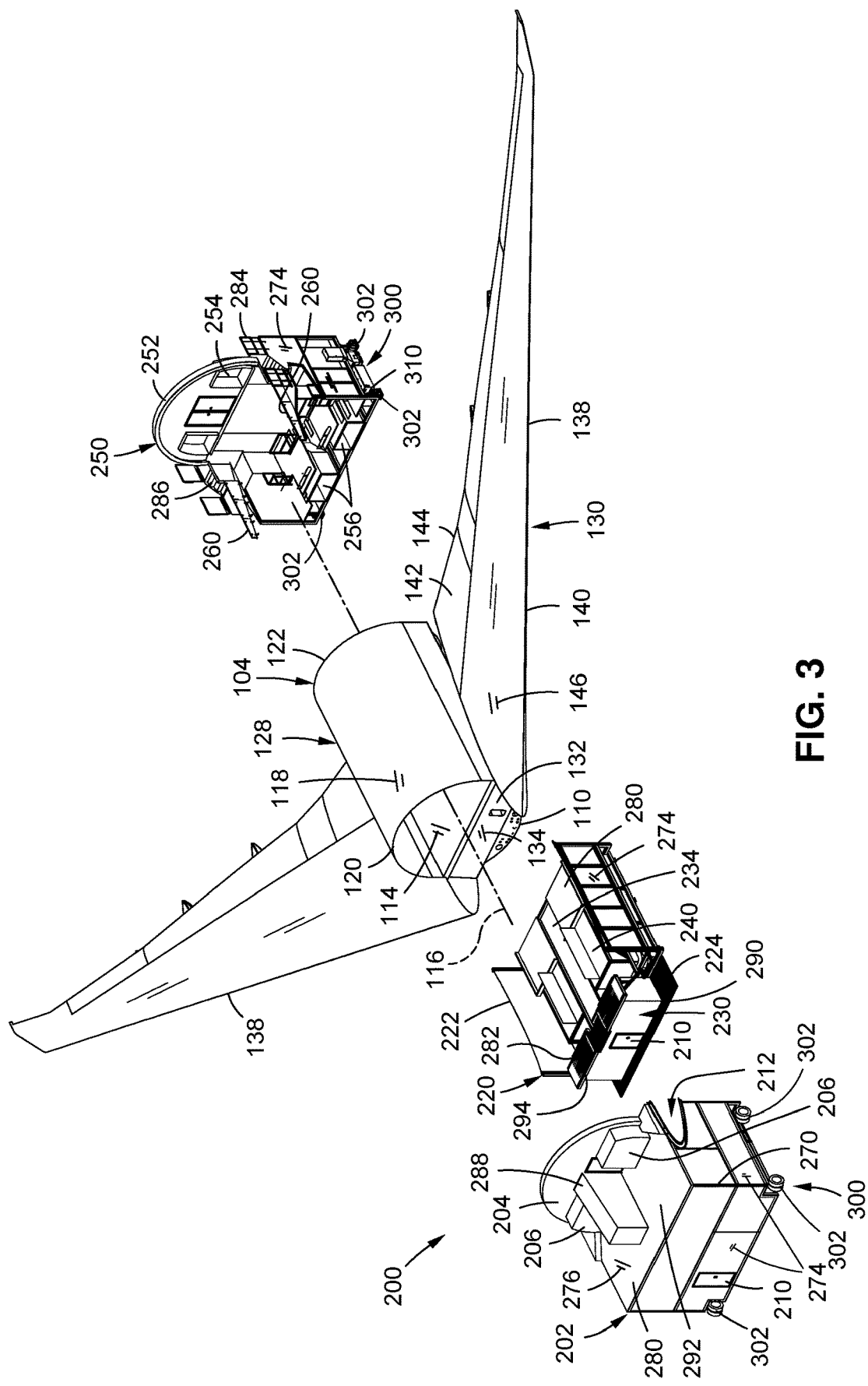
FIG. 3 is an exploded perspective view of an example of a forward module, a center module, and an aft module prior to assembly around a wing-body section.

Referring now to the drawings wherein the showings are for purposes of illustrating preferred and various embodiments of the disclosure, shown in FIG. 1 is a perspective view of an aircraft 100. The aircraft 100 includes a fuselage 102 having a forward end, an aft end, and an aircraft longitudinal axis 116 (FIG. 3). The aft end of the fuselage 102 includes an empennage having a vertical tail and one or more horizontal tails. The aircraft 100 includes a pair of wings 138 extending outwardly from the fuselage 102. The wings 138 may be joined by a centrally located wing box 132 (FIG. 6) to form a wing assembly 130. The fuselage 102 may be divided into one or more fuselage sections including a fuselage center section 104. The fuselage center section 104 and the wing assembly 130 may be joined to form a wing-body section 128 (FIG. 3).

Figure 2:
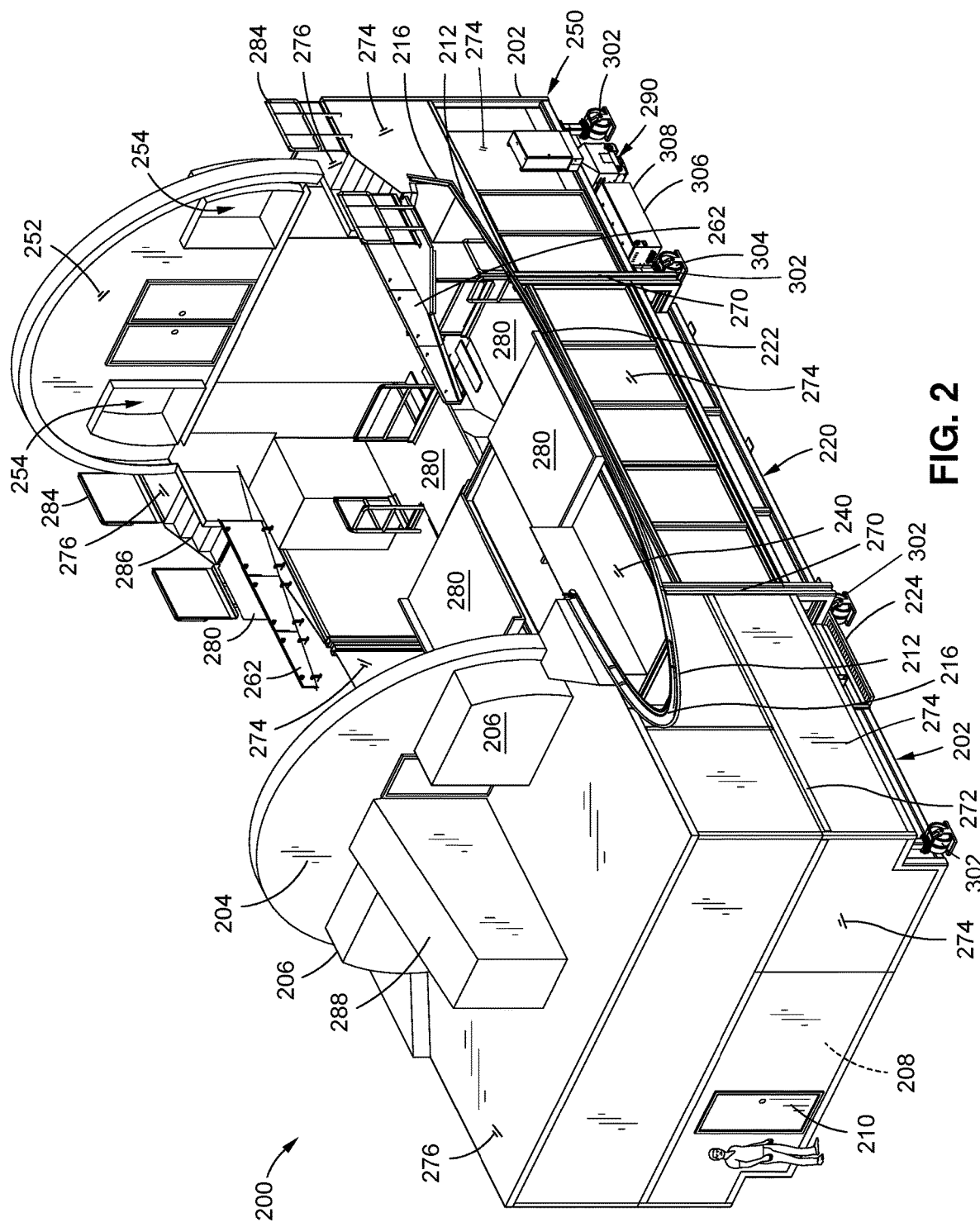
FIG. 2 is a perspective view of an example of a spray containment system having a forward module, a center module, and an aft module for enclosing portions of a wing-body section of the aircraft of FIG. 1.
Figure 10:
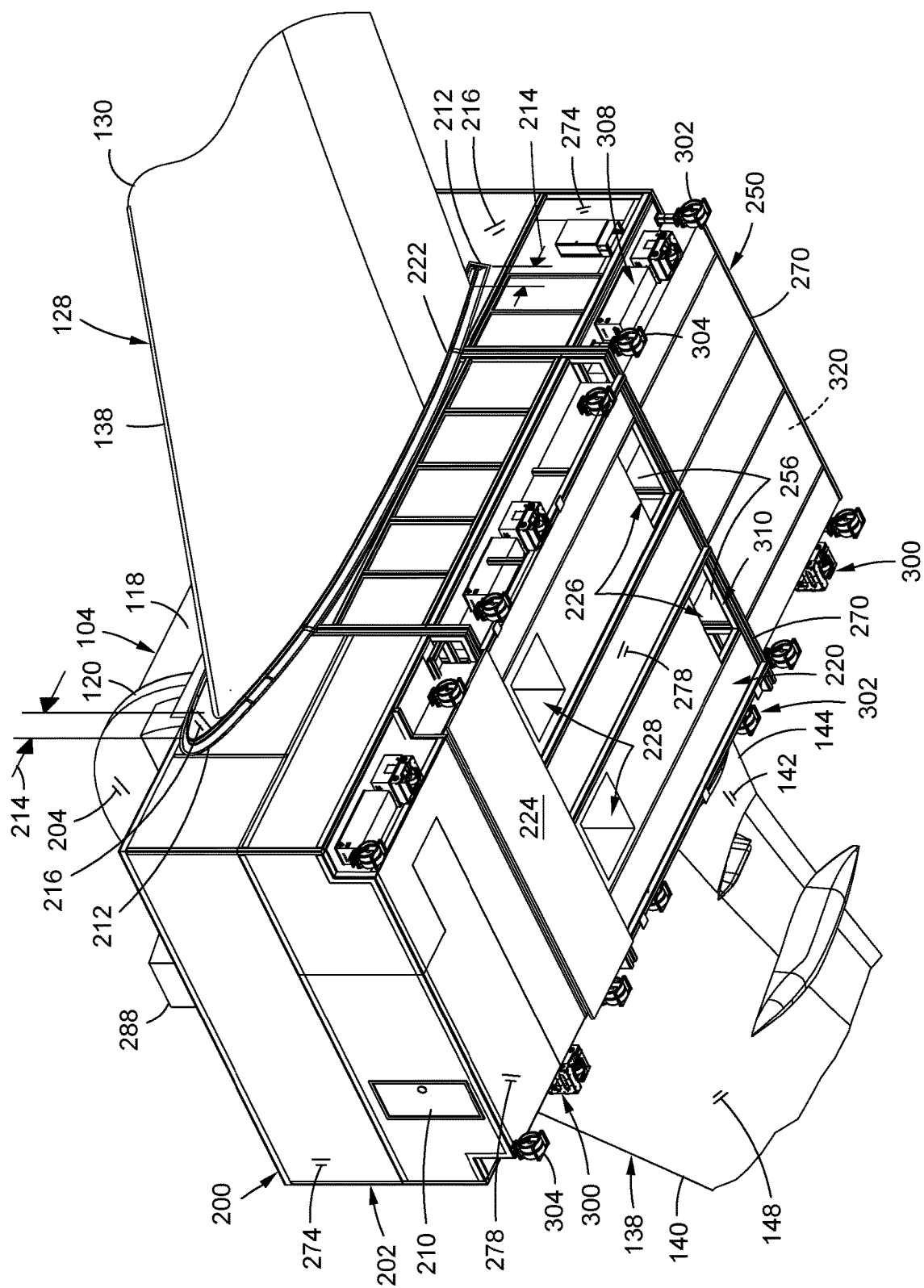
FIG. 10 is a bottom perspective view of the spray containment system assembled around the wing-body section and illustrating air intake ports and air exhaust ports for circulating air through the internal environment of the spray containment system.

FIG. 2 shows an example of a modular, floor-supported, spray containment system 200 having a forward module 202, a center module 220, and an aft module 250, and which are shown in an assembled state with the wing-body section omitted for clarity. The forward module 202, center module 220, and aft module 250 each include module side panels 274 (e.g., vertical walls) and module floor panels 278 (FIG. 10). The forward module 202 and the aft module 250 additionally include module ceiling panels 276. When the forward module 202, center module 220, and aft module 250 are assembled around the wing-body section 128 (e.g., FIG. 7), the forward module 202 and the aft module 250 are each sized and configured to be mated to and/or be butted up or sealed against the respective forward end and aft end of the center module 220. In addition, the center module 220 is butted up or sealed against the wing lower surfaces 148.

As described in greater detail below, the forward module 202 and/or the aft module 250 may include one or more personnel doors 210 to allow access by technicians to the internal environment 320 (e.g., FIGS. 7-9) collectively enclosed by the spray containment system 200 and surfaces of the wing-body section 128 when the forward module 202, center module 220, and aft module 250 are assembled around the wing-body section 128. The forward module 202, center module 220, and aft module 250 may include stairways 286 and/or work platforms 280 that are strategically located to allow technicians access to surfaces of the wing-body section 128 (FIGS. 4-6) requiring the application of protective coatings. As described in greater detail below, the spray containment system 200 may include a ventilation system 310 (e.g., FIG. 17-23) for filtering and circulating air through the internal environment 320.

Figure 7:
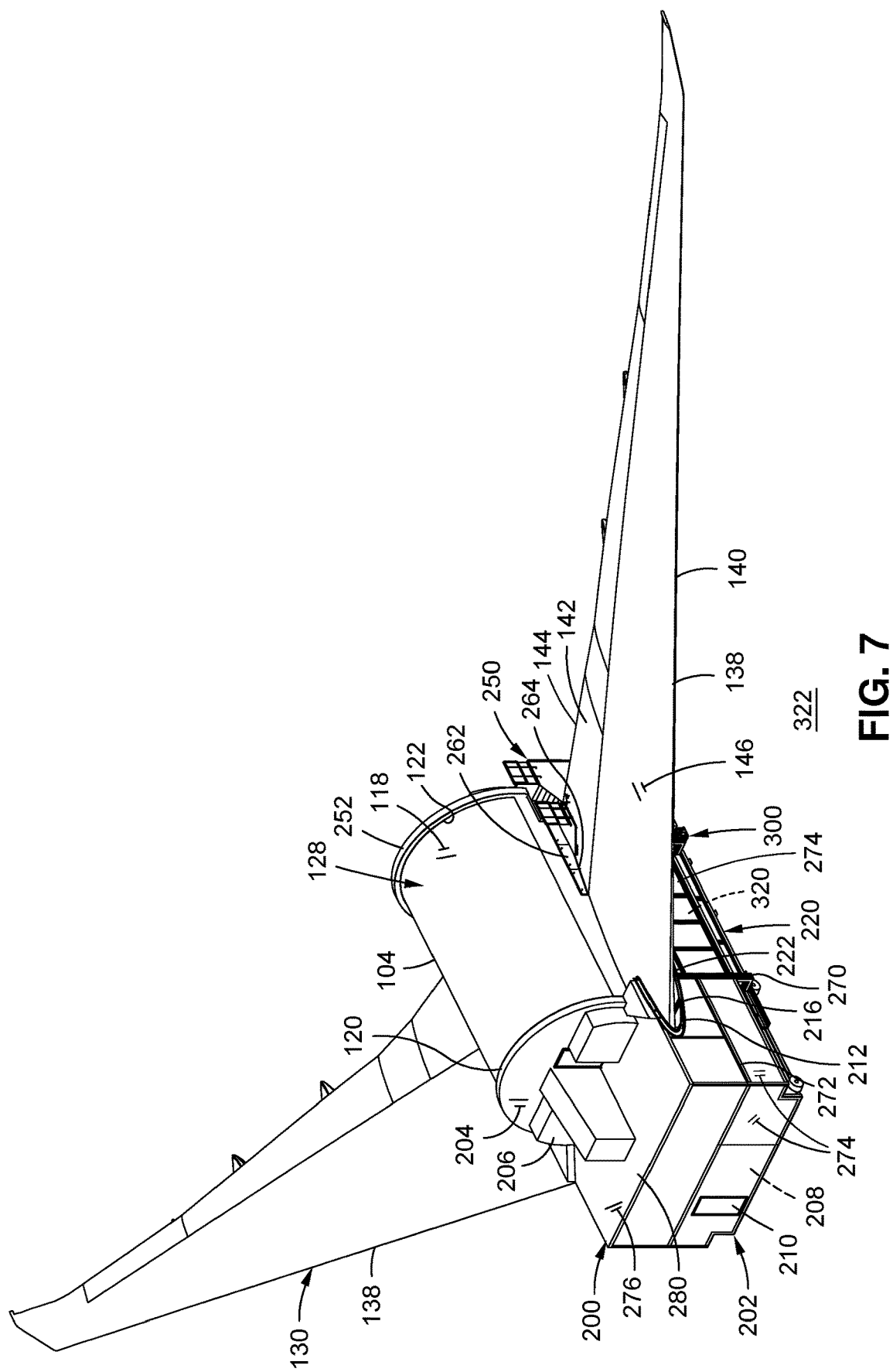
FIG. 7 is a perspective view of the spray containment system assembled around the wing-body section.

FIG. 3 shows the forward module 202, the center module 220, and the aft module 250 prior to assembly around a wing-body section 128. Advantageously, the forward module 202, the aft module 250 and optionally the center module 220 may be moved independent of one another along a floor surface (e.g., a factory floor) for assembly around the wing-body section 128 as shown in FIG. 7 and described below. For example, the forward module 202, the aft module 250, and optionally the center module 220 may be supported on wheels 302 for translation along a factory floor such as by using a tug (not shown). Alternatively, the forward module 202, the aft module 250, and optionally the center module 220 may each include a module drive system 300 (e.g., FIG. 9) having at least one powered drive wheel 304 for self-propelled movement along a factory floor, as described in greater detail below.

Figure 24:
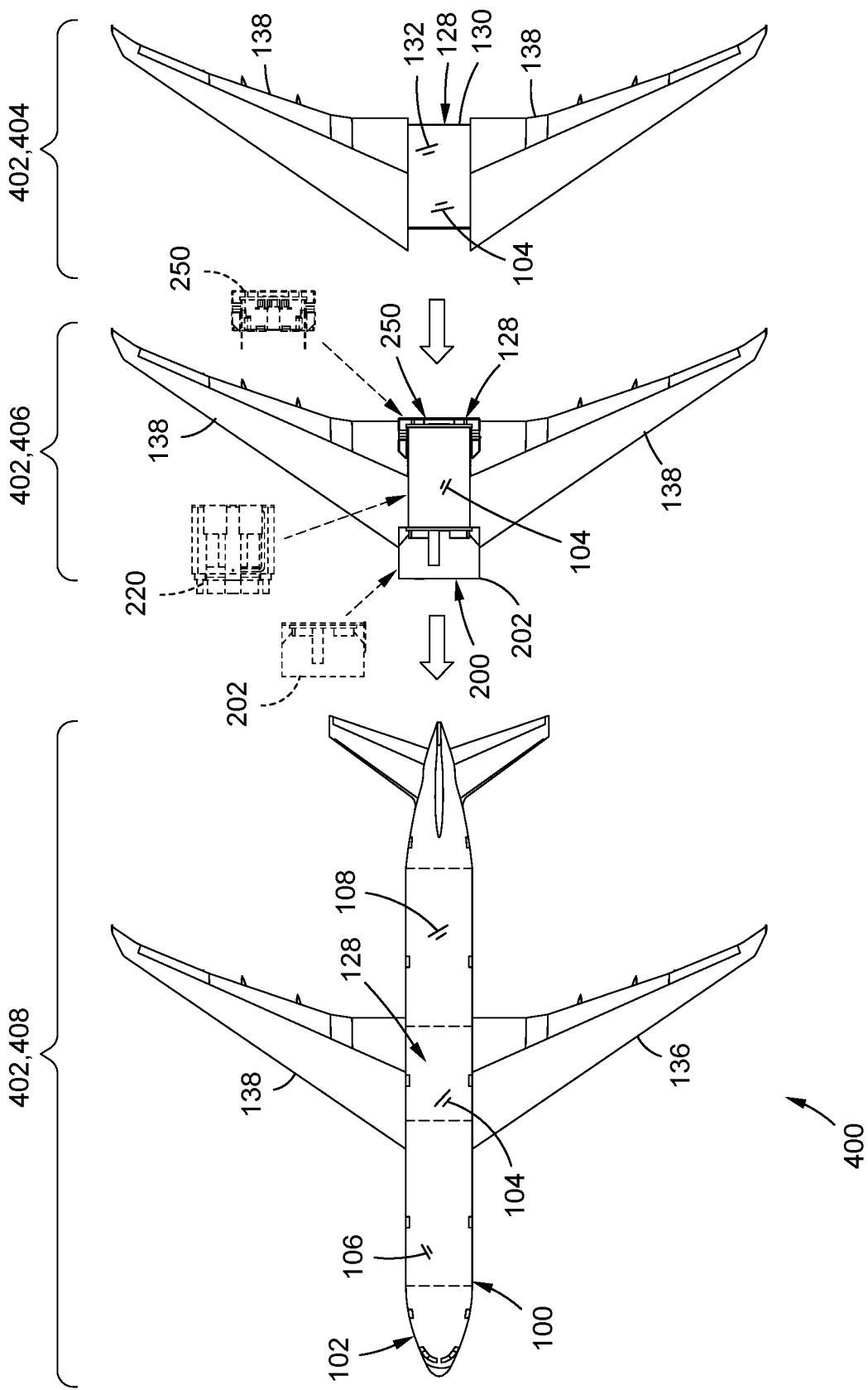
FIG. 24 is a plan view of an aircraft production line having a coating application position in which the forward module, center module, and aft module of the spray containment system are assembled around a wing-body section.

In some examples, the wheels 302 may be omitted from the center module 220 which may be stationary on the factory floor. In such an arrangement, the center module 220 may be configured in a manner that allows the wing-body section 128 to be moved into position over the stationary center module 220, after which the forward module 202 and aft module 250 may be moved into contact with the respective forward end and aft end of the center module 220 and the modules are assembled against the wing-body section 128. At the completion of a coating application process, the forward module 202, the aft module 250, and optionally the center module 220 may be independently moved away from the wing-body section 128 to allow the wing-body section 128 to be moved to another location such as another line position in an aircraft production line 400 (FIG. 24). In this regard, the spray containment system 200 advantageously reduces or avoids the need for an overhead crane (not shown) for enclosing the wing-body section 128.

FIGS. 4-6 illustrate the components of the wing-body section 128, any one or more of which may require localized application of one or more coatings. FIG. 4 is a top-down view of the fuselage center section 104 joined to a wing assembly 130. The wing assembly 130 includes a pair of wings 138 joined together by a wing box 132 (FIGS. 5-6). In addition to carrying structural loads from the wings 138 and fuselage 102, the wing box 132 may function as a fuel tank and may therefore require the application of a fuel vapor barrier coating to one or more areas of the wing box 132. FIG. 5 is a bottom-up view of the fuselage center section 104 joined to the wing assembly 130. The fuselage center section 104 includes a keel beam 126 that extends along the length of the fuselage center section and separates a pair of wheel wells 124 extending from a rear spar 136 of the wing box 132 to an aft bulkhead 112 of the fuselage center section 104. In FIG. 6, the wings 138 are omitted to illustrate components of the wing box 132 that may receive protective coatings including a front spar 134, a rear spar 136, a wing upper surface 146, and a wing lower surface 148.

Figure 18:
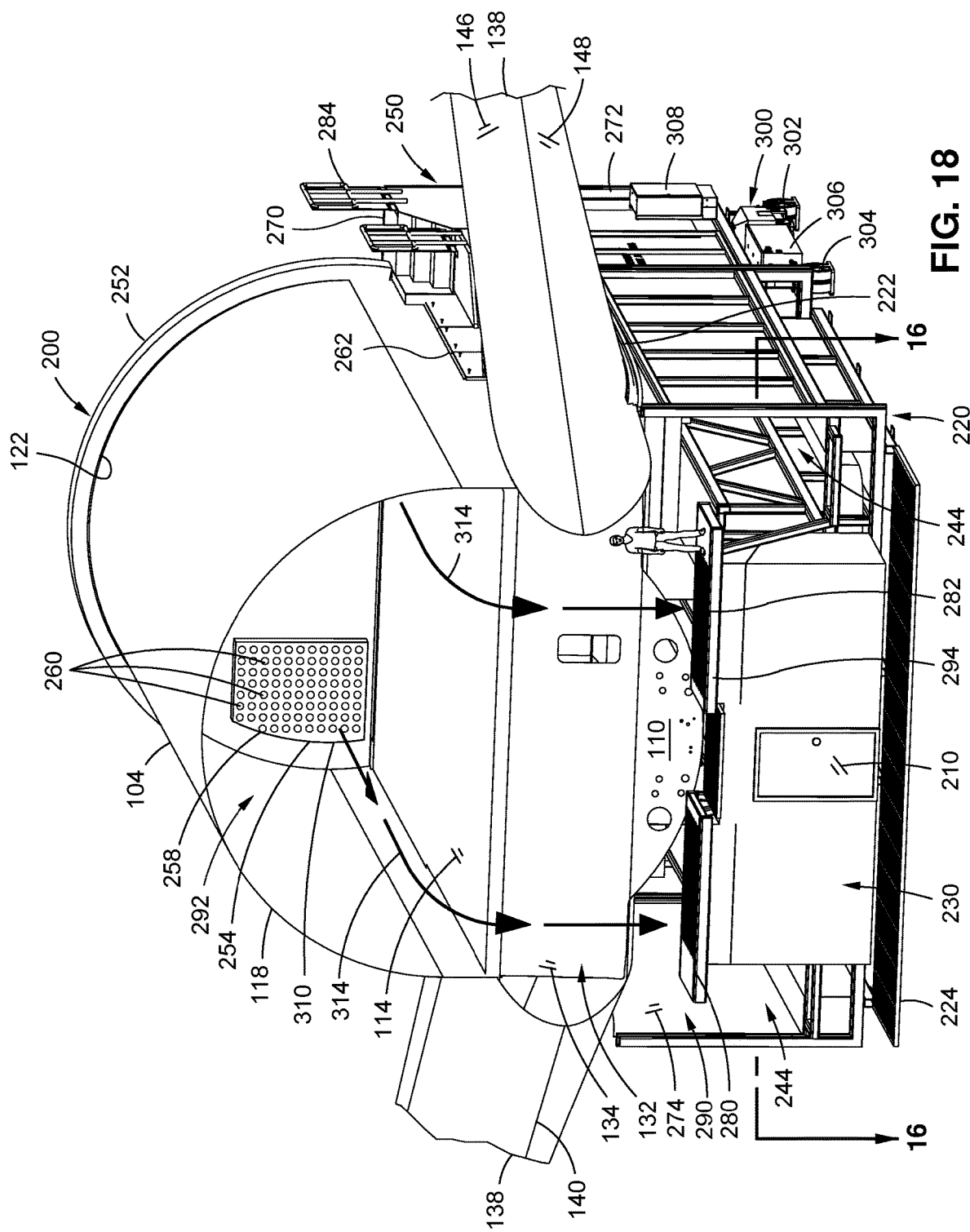
FIG. 18 is a perspective view of the interior of the fuselage illustrating a first airflow direction of air along an upper level of the wing-body section and further illustrating the air flowing into a plenum room of the center module.

In FIGS. 4-6, the fuselage center section 104 includes a fuselage skin 118 extending from a forward skin edge 120 to an aft skin edge 122. The fuselage center section 104 may also include a cabin floor 114 which may be described as a dividing plane dividing the internal environment 320 into an upper level 292 (FIG. 18) and a lower level 290 (FIG. 18). Localized areas of the interior of the fuselage center section 104 may require the application of protective coatings such as paint, fuel vapor barrier coating, and/or corrosion inhibiting compound. Below the cabin floor 114, the fuselage center section 104 may include a portion of a forward bulkhead 110 (FIG. 6) extending below the front spar 134, and the above-mentioned aft bulkhead 112 (FIGS. 4-5). As mentioned above, the wing box 132 may be defined by the front spar 134 and the rear spar 136 which may also require the localized application of paint, fuel vapor barrier coating, and/or corrosion inhibiting compound. At locations adjacent the fuselage skin 118, the wing upper surface 146 and/or the wing lower surface 148 may also require the localized application of paint and/or corrosion inhibiting compound.

FIG. 7 shows the forward module 202, center module 220, and aft module 250 assembled against the fuselage center section 104 and wings 138 for enclosing the wing-body section 128. The forward module 202 and the aft module 250 and optionally the center module 220 are configured to be assembled around and sealingly mated to the wing-body section 128 in a manner such that the mass of the wing-body section 128 is supported independent of the spray containment system 200. When assembled around the wing-body section 128, the forward module 202, center module 220, and aft module 250 may be non-fixedly coupled to each other but may be sealingly mated to each other at the module interfaces 270. For example, resiliently compressible material (not shown) such as foam, sponge rubber, a rubber extrusion such as a rubber bulb seal extrusion, or other sealing material or sealing mechanism may be included at the module interface 270 between the forward module 202 and the center module 220, and between the center module 220 and the aft module 250.

Figure 8:
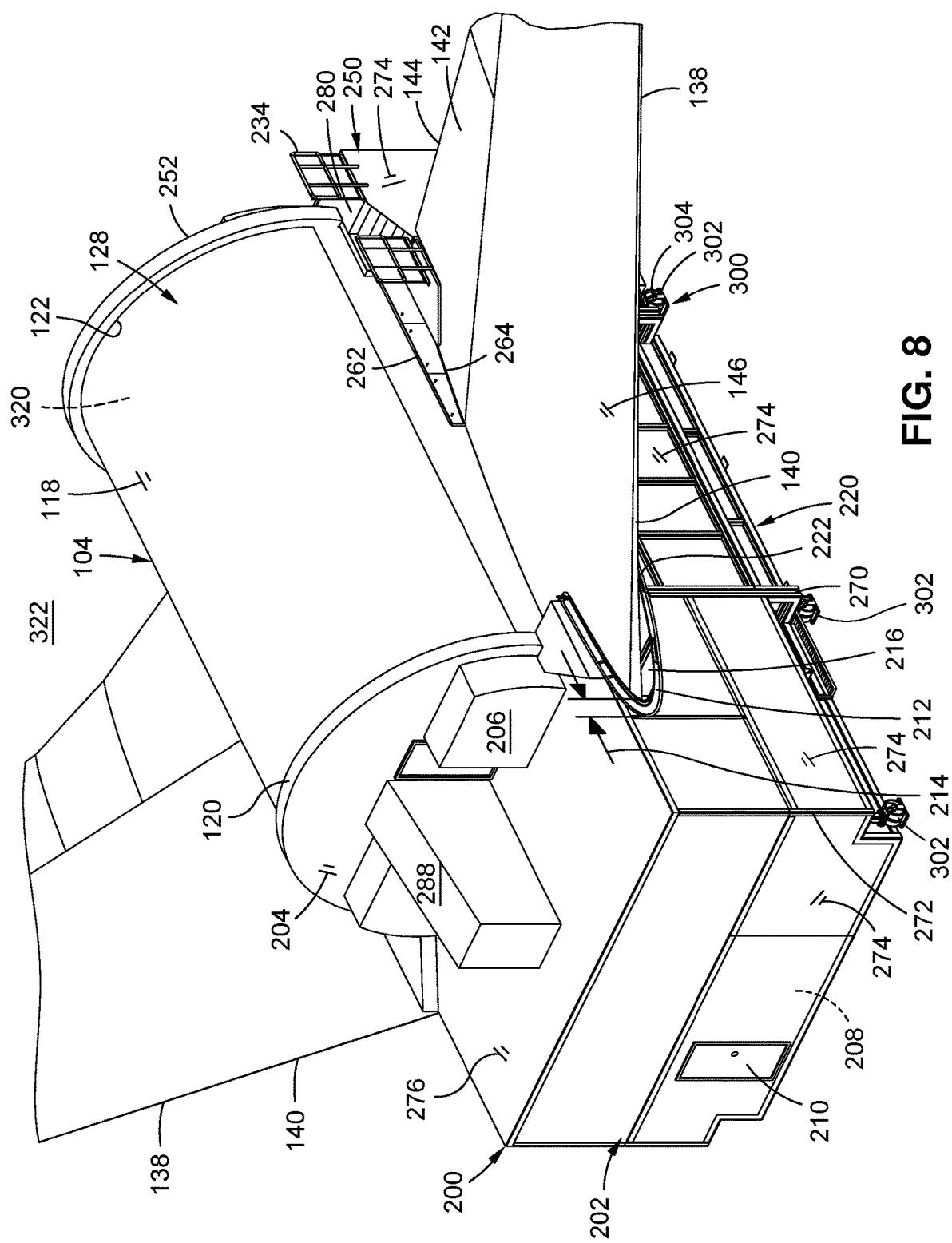
FIG. 8 is a top perspective view of a forward end of the spray containment system sealed to the wings and fuselage of the wing-body section.

Referring to FIG. 8, the modular spray containment system 200 exploits the aircraft 100 structure to enclose the wing-body section 128 by sealing against the forward skin edge 120 and aft skin edge 122 of the upper portion of the fuselage skin 118. For example, the forward module 202 has a forward closeout panel 204 oriented transverse (e.g., perpendicular) to the lengthwise direction of the fuselage center section 104. The forward closeout panel 204 is configured to engage or sealingly mate against a forward skin edge 120 of the fuselage skin 118 for at least partially closing off the upper level 292 of the forward end of the fuselage center section 104. Likewise, the aft module 250 has an aft closeout panel 252 oriented transverse (e.g., perpendicular) to the lengthwise direction of the fuselage center section 104. The aft closeout panel 252 is configured to engage or sealingly mate against an aft skin edge 122 of the fuselage skin 118 for at least partially closing off the upper level 292 of the aft end of the fuselage center section 104.

Referring still to FIG. 8, the spray containment system 200 additionally exploits the aircraft 100 structure by sealing against the wing upper surface 146 and the wing lower surface 148 of the wings 138. For example, the center module 220 has opposing module side panels 274, each of which has a panel upper edge 222 (e.g., FIG. 10) configured complementary to the cross-sectional profile of the wing lower surface 148 and allowing the module side panel 274 to sealingly engage the wing lower surface 148. Although shown as being generally vertically oriented, the module side panels 274 may be arranged in any orientation capable of sealing against the wing lower surfaces 148. Depending upon the aircraft configuration, the module side panels 274 of the forward module 202 may each include a cutout 212 configured complementary to the profile shape of the wing leading edge 140. Likewise, the module side panels 274 of the aft module 250 may each include a cutout 212 configured complementary to the cross-sectional profile of the wing aft portion 142 or wing trailing edge 144. As described in greater detail below, the cutouts 212 in the forward module 202 and/or the aft module 250 may include a cutout seal 216 configured to sealingly conform to different wing cross-sectional profiles. In this regard, the aft module 250 and optionally the forward module 202 may include movable and/or detachable seal plates 262 respectively mounted to the opposing module side panels 274. Each one of the movable and/or detachable seal plates 262 may have a lower edge configured complementary to the cross-sectional profile of the wing. For example, the lower edge of the seal plates 262 may be configured complementary to the cross-sectional profile of the wing aft portion 142 or wing trailing edge 144, as described in greater detail below. Seal plates 262 of different cross-sectional profile may be interchangeably mounted to the aft module 250 to match the cross-sectional profile of the wing configuration of the wing-body section 128 to be enclosed by the spray containment system 200.

Figure 9:
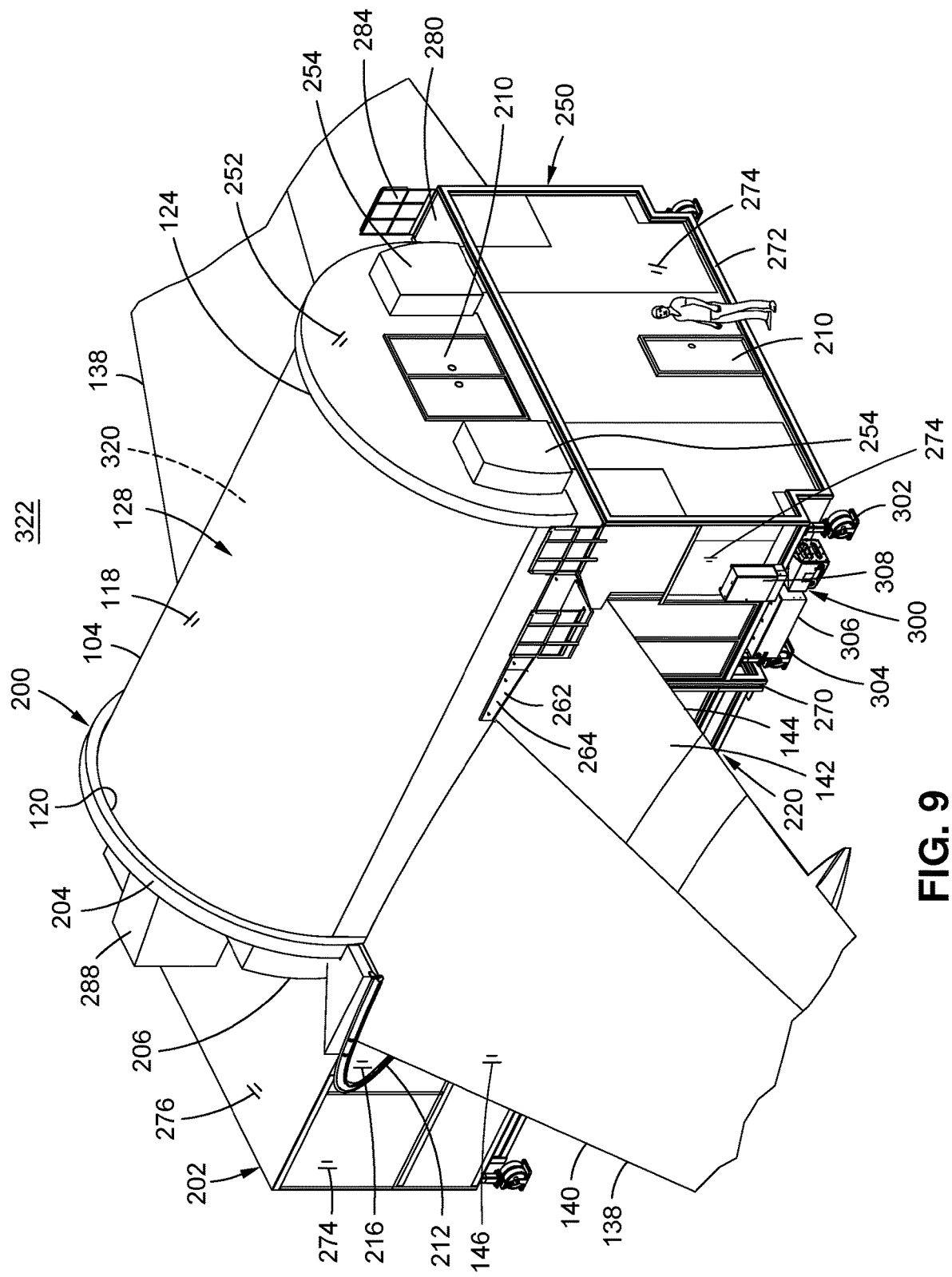
FIG. 9 is a top perspective view of an aft end of the spray containment system sealed to the wings and fuselage of the wing-body section.

In FIGS. 8-9, the forward module 202, center module 220, and aft module 250 are assembled together and sealed to the surfaces of the wing-body section 128. As mentioned above, the spray containment system 200 and wing-body section 128 collectively define the internal environment 320 which includes a volume of space within the interior (e.g., FIG. 18) of the fuselage center section 104 and a volume of space (FIG. 19) below, forward, and aft of the wing box 132. The forward module 202 and the aft module 250 may each have a personnel door 210 for entry into the spray containment system 200. In the forward module 202, the personnel door 210 (FIG. 8) may enter into a changing room 208 (FIG. 13) where personnel (e.g., technicians) may change into and out of protective gear and/or protective clothing. As described below, the spray containment system 200 may be configured such that personnel may enter through the personnel door 210 at either the forward module 202 (FIG. 8) or the aft module 250 (FIG. 9) and move to any location within the internal environment 320 without having to exit the spray containment system 200.

The spray containment system 200 is configured to contain contaminants resulting from the application of coatings to the wing-body section 128, and prevent the escape of such contaminants from the internal environment 320 to the external environment 322. The external environment 322 may be described as the environment in which the spray containment system 200 is located such as a manufacturing facility, a production facility or a factory. Contaminants resulting from the application of coatings may include vapors, overspray, and/or liquids. Vapors may include evaporant or fumes off-gassing from coatings such as paint, fuel vapor barrier, corrosion inhibiting compounds, solvents, sealants, adhesives, or any other type of coating. Overspray may include airborne particles and/or atomized chemicals resulting from the sprayed application of the above-mentioned coatings. As described below, the spray containment system 200 may include a ventilation system 310 (e.g., FIG. 17-23) for filtering contaminants from the air in the internal environment 320. Liquid contamination may include any one of a variety of different types of liquids including, but not limited to, solvents and/or aqueous wash such as may be used in the process of preparing a surface to receive a protective coating. The spray containment system 200 may include a drainage system (FIG. 11) for collecting liquid contamination which may optionally be discharged to an external drainage system (not shown).

FIG. 10 is a bottom view of the spray containment system 200 assembled around the wing-body section 128. Although the center module 220 is illustrated as having wheels 302 and a module drive system 300 similar to the forward module 202, wheels 302 may be omitted from the center module 220 which may be stationary on the factory floor, as mentioned above. In such an arrangement, the center module 220 may having a relatively low profile that allows the wing-body section 128 to be translated generally horizontally into position over the stationary center module 220. Alternatively, an overhead crane (not shown) may be implemented for moving the wing center section into position over the center module 220. Once the wing-body section 128 is in position relative to the center module 220, the forward module 202 and the aft module 250 may be assembled around and butted up against the respective forward end and aft end of the center module 220 for enclosing the wing-body section 128.

Also shown in FIG. 10 are the cutouts 212 in the module side panels 274 of the forward module 202 and in the module side panels 274 of the aft module 250 for respectively receiving the wing leading edge 140 and wing trailing edge 144 or wing aft portion 142. The cutout 212 in the module side panels 274 of the forward module 202 and/or the aft module 250 may be sized and configured to provide a gap 214 relative to the respective wing leading edge 140 and wing aft portion 142. Each cutout 212 may include a cutout seal 216 configured to sealingly conform to the cross-sectional profile of the wing and thereby close off the gap 214 when the spray containment system 200 is assembled around the wing-body section 128.

Figure 21:
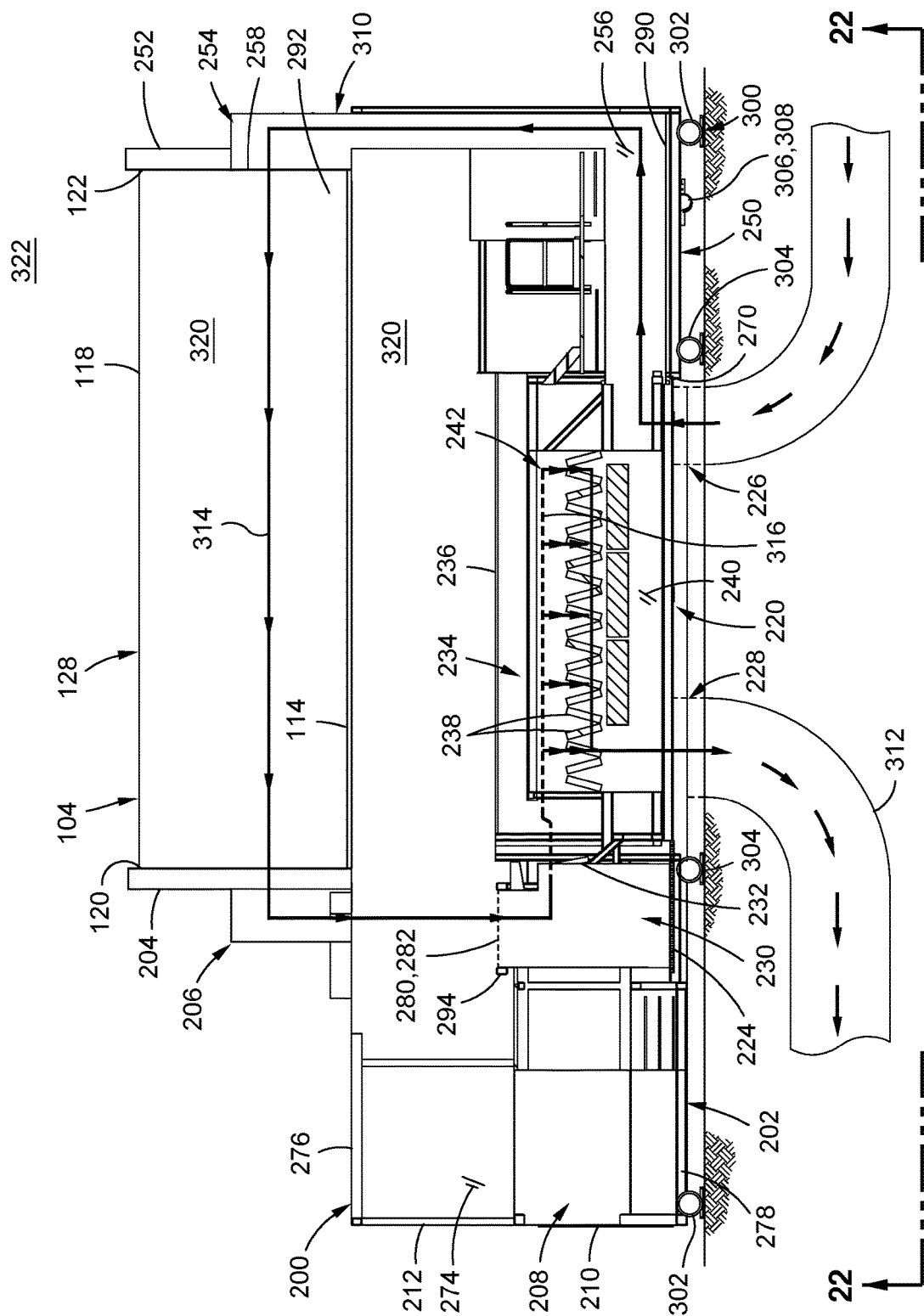
FIG. 21 is a side sectional view of the spray containment system taken along line 21 of FIG. 20 with the wing box of the wing-body section omitted for clarity, and illustrating the flow of air from an external duct system into air intake ports in the center module and further illustrating the air passing through the upper level of the wing-body section before flowing downwardly along a lower level of the spray containment system prior to passing out of the air exhaust ports in the center module.

In FIG. 10, also shown are a pair of air intake ports 226 formed in the module floor panel 278 of the center module 220 for receiving air from an external duct system 312 (FIG. 21). Alternatively, as described below, air may instead be drawn directly from the external environment 322 such as through one-way vents (not shown) located at each one of the air inlets 254 on the aft closeout panel 252. Shown in FIG. 10 are a pair of air exhaust ports 228 formed in the module floor panel 278 of the center module 220 for discharging air from the internal environment 320 to the external duct system 312. The air intake ports 226 and the air exhaust ports 228 are part of the ventilation system 310 for circulating air through the internal environment 320 collectively enclosed by the spray containment system 200 and the wing-body section 128. The air intake ports 226 and the air exhaust ports 228 may be fluidly coupled to the external duct system 312 which may be integrated into the factory subfloor as shown in FIG. 21. In an embodiment not shown, the external duct system 312 may be an above-ground duct system, such as a duct system configured to exhaust air to a factory roof. The air intake ports 226 and the air exhaust ports 228 are fluidly couplable to the external duct system 312 in a manner preventing the escape of contaminants to the external environment 322.

Figure 11:
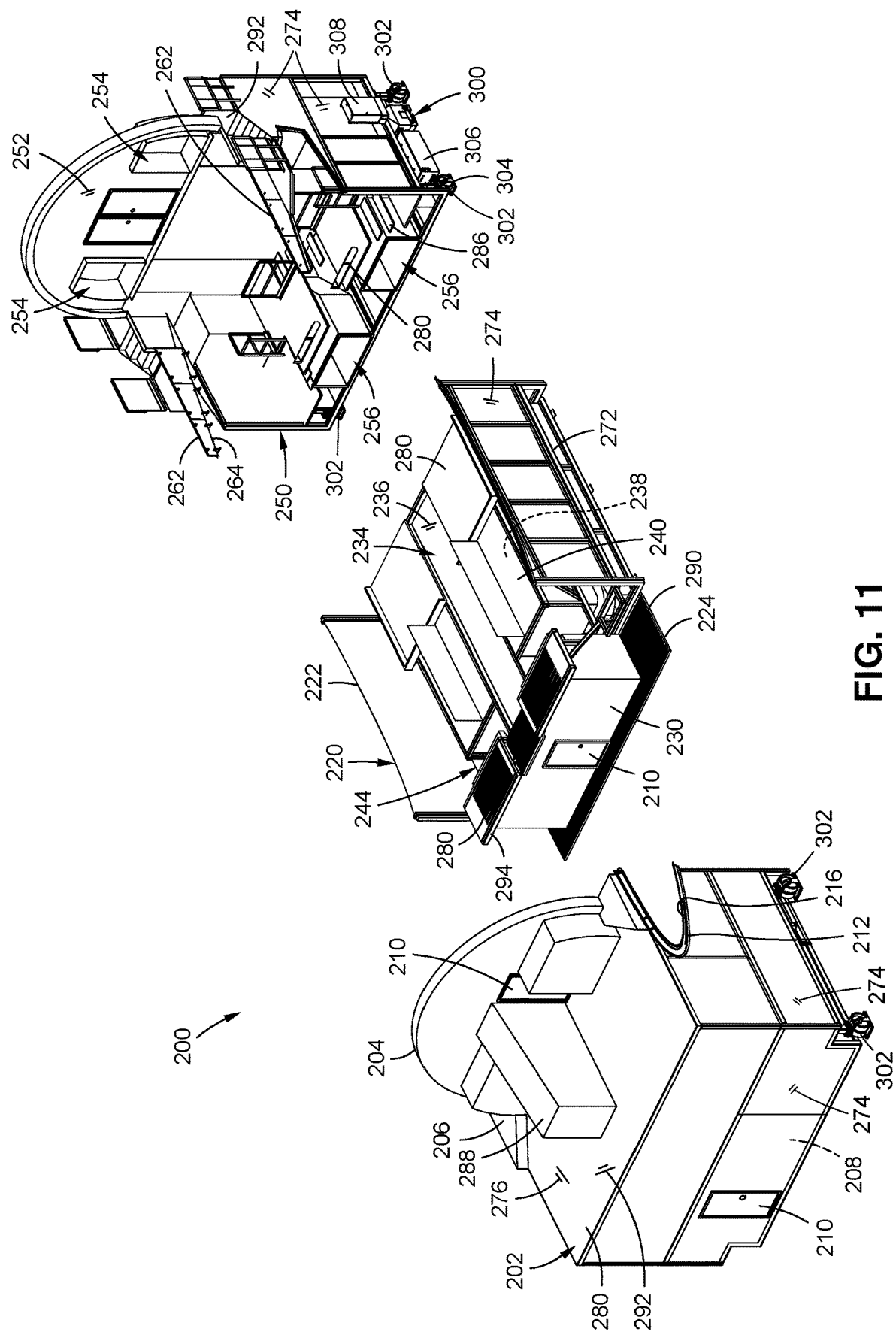
FIG. 11 is an exploded perspective view of the forward module, center module, and aft module of the spray containment system.

FIG. 11 is a perspective view of the forward module 202, center module 220, and aft module 250 in a disassembled state. Shown are the cutouts 212 formed in the module side panels 274 of the forward module 202, and which may be contoured complementary to the cross-sectional profile of the wing upper surface 146 (FIGS. 9-10) and the wing lower surface 148 (FIGS. 9-10) along the wing leading edge 140 (FIGS. 9-10). In the center module 220, shown are the contoured panel upper edges 222 of the module side panels 274. In the aft module 250, shown are the cutouts 212 formed in the module side panels 274 for conforming to the cross-sectional contour of the wing lower surface 148 (FIG. 10) at the wing trailing edge 144. Also shown are the seal plates 262 movably mounted respectively to the module side panels 274 on opposite sides of the aft module 250. As mentioned above, the lower edge of the seal plate 262 may be contoured generally complementary to the cross-sectional profile of the wing upper surface 146 (FIG. 9) at the wing trailing edge 144.

Figure 12:
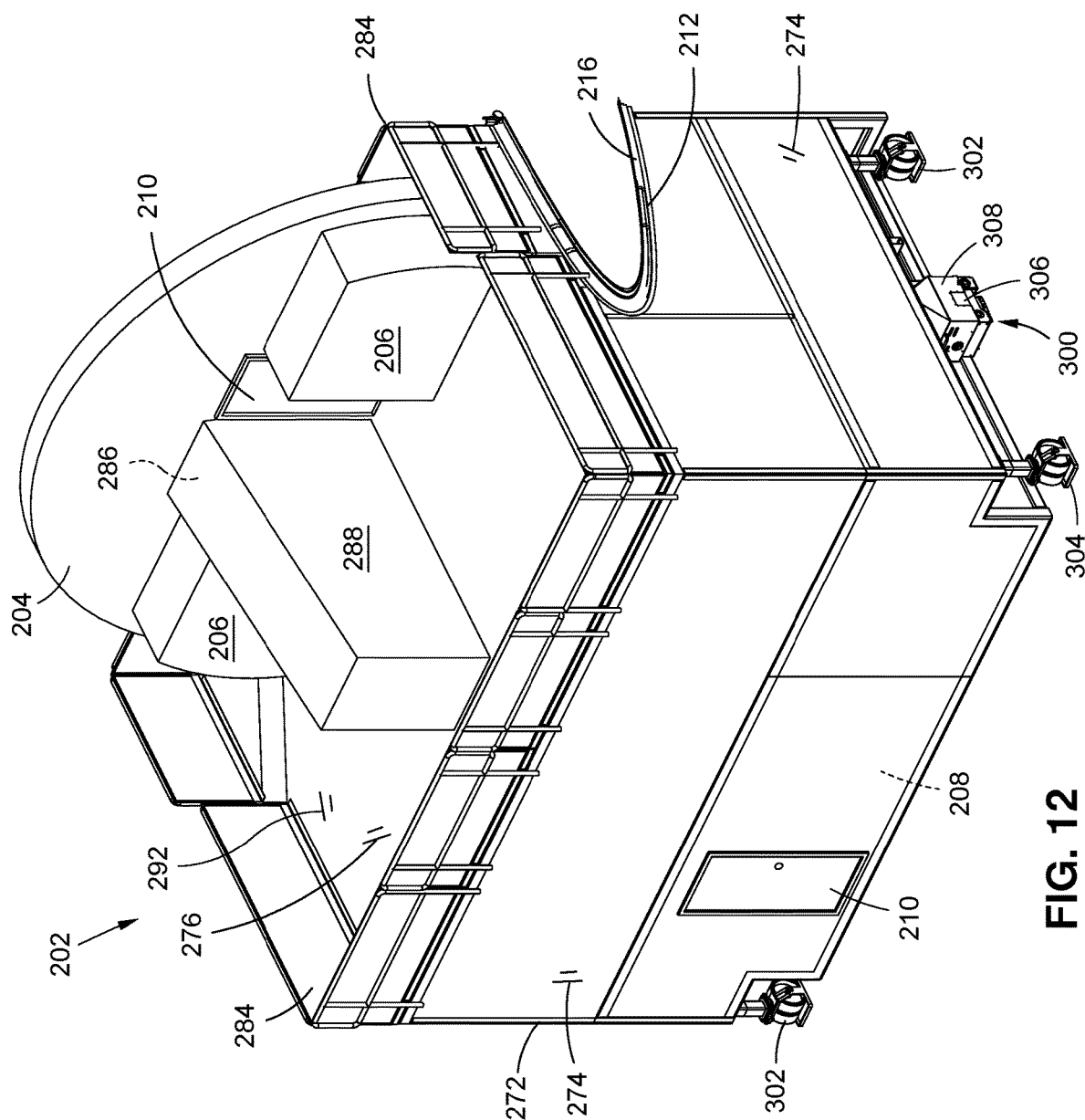
FIG. 12 is a perspective view of a forward end of the forward module.

Referring to FIG. 12, shown is an aft-looking perspective view of the forward module 202. The forward module 202 may be constructed as a rigid frame 272 made up of frame members optionally formed of metallic material. The module floor panels 278, the module side panels 274, and the module ceiling panels 276 may be removably or fixedly attached to the rigid frame 272. The module panels 274, 276, 278 may be provided as non-permeable material and may be either rigid or flexible metallic material (e.g., sheet-metal) and/or nonmetallic material (e.g., plastic sheeting). Alternatively, the rigid frame 272 may be omitted, and the spray containment system 200 may be constructed of load-bearing panels (not shown) assembled in a monocoque construction (not shown).

Also shown in FIG. 12 are the cutouts 212 respectively formed in the module side panels 274 of the forward module 202. In some examples, each one of the cutouts 212 may include a cutout seal 216 lining the cutouts 212. Each cutout seal 216 may be formed of elastomeric or resiliently-conformable material configured to conform to the cross-sectional contour of a wing leading edge 140 when received within the cutout 212. For example, a cutout seal 216 may be provided as a flexible membrane or sheet formed of elastomeric material such as silicone rubber and configured to conform to different wing leading edge cross-sectional profiles as the forward module 202 is assembled against the forward end of a wing-body section 128 and the wing leading edges area inserted into the cutouts 212 in the module side panels 274. Alternatively, a cutout seal 216 may be provided as a strip of resiliently compressible material such as foam rubber configured to conform to different wing leading edge cross-sectional profiles.

Referring still to FIG. 12, the forward module 202 may include module ceiling panels 276 which may enclose the top of the aft module and may also serve as a work platform 280 for the upper level 292 of the forward module 202. For personnel safety, the upper level 292 of the forward module 202 defined by the module ceiling panels 276 may include handrails 284 extending along the perimeter edges of the forward module 202. The upper level 292 of the forward module 202 may be accessible via one or more stairways 286 (e.g., FIGS. 13 and 19) and a personnel door 210 at the top of the uppermost stairway 286 (FIG. 13) which may be covered by a stairwell cover 288. Also shown in FIG. 12 is a personnel door 210 on an exterior side of the changing room 208. The changing room 208 may provide an enclosed space where technicians may don protective gear and/or protective apparel prior to entering the interior environment of the spray containment system 200, as mentioned above. Although the changing room 208 is incorporated into the forward module 202, a changing room 208 may alternatively or additionally be incorporated into the aft module (not shown).

Also shown in FIG. 12 are wheels 302 supporting the forward module 202 at each of the approximate location of the four corners of the forward module 202. Such wheels 302 may facilitate movement of the forward module 202 such as along a factory floor such as by using a tug (not shown). At least one of the wheels 302 of the forward module 202 may be a powered drive wheel 304 of a module drive system 300 of the forward module 202. The module drive system 300 may include a motor 306 (e.g., an electric motor) and a controller 308 for self-propelled movement of the forward module 202. The wheel 302 may be pivotable for directionally controlled movement of the forward module 202. The controller 308 of the module drive system 300 may be configured to receive commands (e.g., via remote control) for controlling the movement of the forward module 202.

Figure 13:
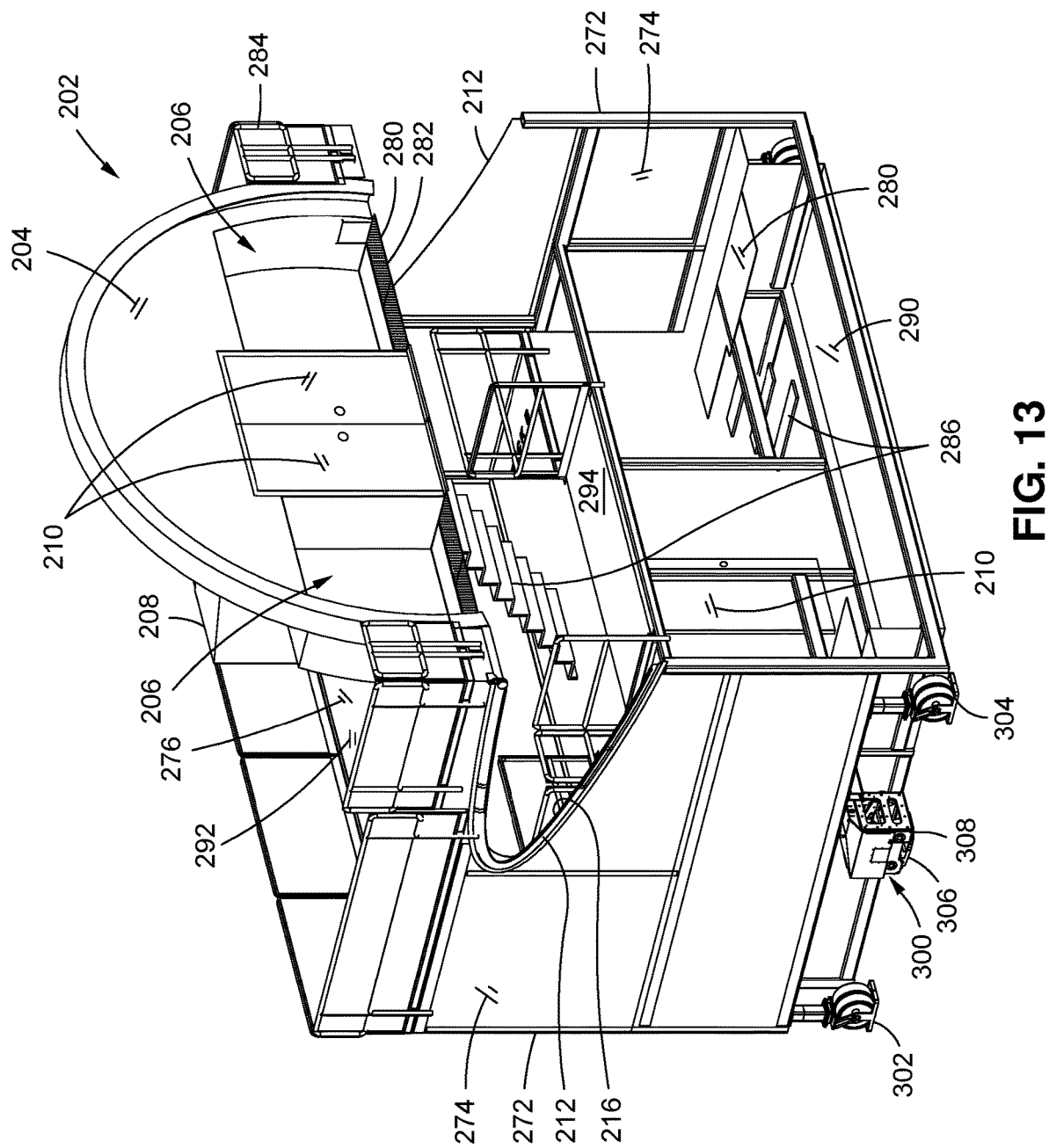
FIG. 13 is a perspective view of an aft end of the forward module.

Referring to FIG. 13, shown is a forward-looking perspective view of the forward module 202 illustrating a personnel door 210 on an interior side of the changing room 208 and through which a technician may enter the internal environment 320 of the spray containment system when assembled around the wing-body section 128 (FIG. 8). The forward module 202 includes a plurality of stairways 286 leading to work platforms 280 strategically positioned at different vertical levels and locations to allow technicians to access different areas of the wing-body section 128 where coatings are to be applied. The lower level 290 of the forward module 202 may be defined by the module floor panels 278 and by which a technician may access a plenum room 230 (FIG. 19) and a plenum chamber 234 (FIG. 19) for removing and replacing filters (FIG. 19) that may be housed within the center module 220 as described in greater detail below. The forward module 202 may also include a mid level 294 located above the lower level 290 and below the upper level 292. The mid level 294 may facilitate technician access to the front spar 134 (FIG. 18) and the forward bulkhead 110 (FIG. 18) of the wing-body section 128.

Figure 19:
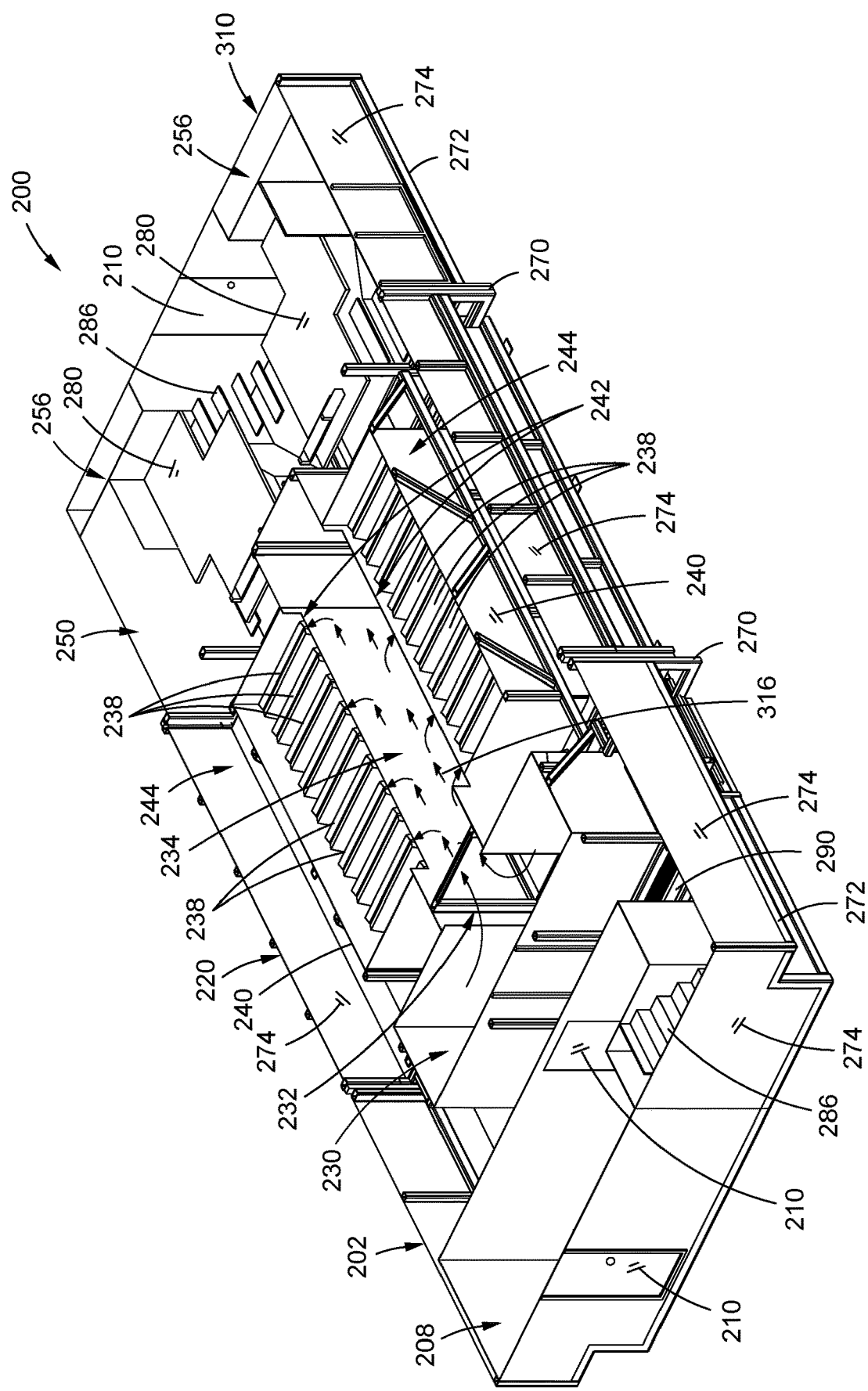
FIG. 19 is a perspective sectional view of the spray containment system taken along line 19 of FIG. 18 and illustrating the air flowing from the plenum room into a plenum chamber and flowing generally along a second airflow direction prior to flowing into a pair of filter housings containing air filters.

Also shown in FIGS. 12-13 is the forward closeout panel 204 which is configured to be butted up against the forward skin edge 120 (FIG. 9) of the fuselage skin 118 (FIG. 9) when the spray containment system 200 is assembled around a wing-body section 128 (FIG. 9). As mentioned above, the forward closeout panel 204 includes the personnel door 210 providing access to the interior of the fuselage from the stairway 286 leading from a mid level 294 to the upper level 292 of the forward module 202. An additional personnel door 210 located next to the stairway 286 personnel door 210 to allow access to the work platform 280 on the upper level 292 outside of the internal environment 320. As mentioned above, the upper level 292 of the forward module 202 may be defined by the module ceiling panels 276 and may be approximately flush (e.g., within 6 inches) with the cabin floor 114 (FIG. 18). As shown in FIG. 19, the interior of the forward module 202 may include a stairway 286 located outside the changing room 208 and leading from the lower level 290 to the mid level 294.

Also included in the forward closeout panel 204 are a pair of airflow cavities 206 respectively located on opposing sides of the one or more personnel doors 210 in the forward closeout panel 204. Each one of the airflow cavities 206 may be configured to receive air flowing along the upper level 292 (FIG. 18) of the fuselage center section 104 in a first airflow direction 314 (FIG. 18). The airflow cavities 206 may direct the air downwardly into the plenum room 230 (FIG. 18) of the center module 220. As described below, the plenum room 230 may direct the airflow into a generally horizontal direction along a second airflow direction 316 (FIG. 19) through a plenum chamber 234 (FIG. 19) of the center module 220. The air may flow into one or more filter housings 240 (FIG. 19) extending lengthwise along the plenum chamber 234.

Figure 14:
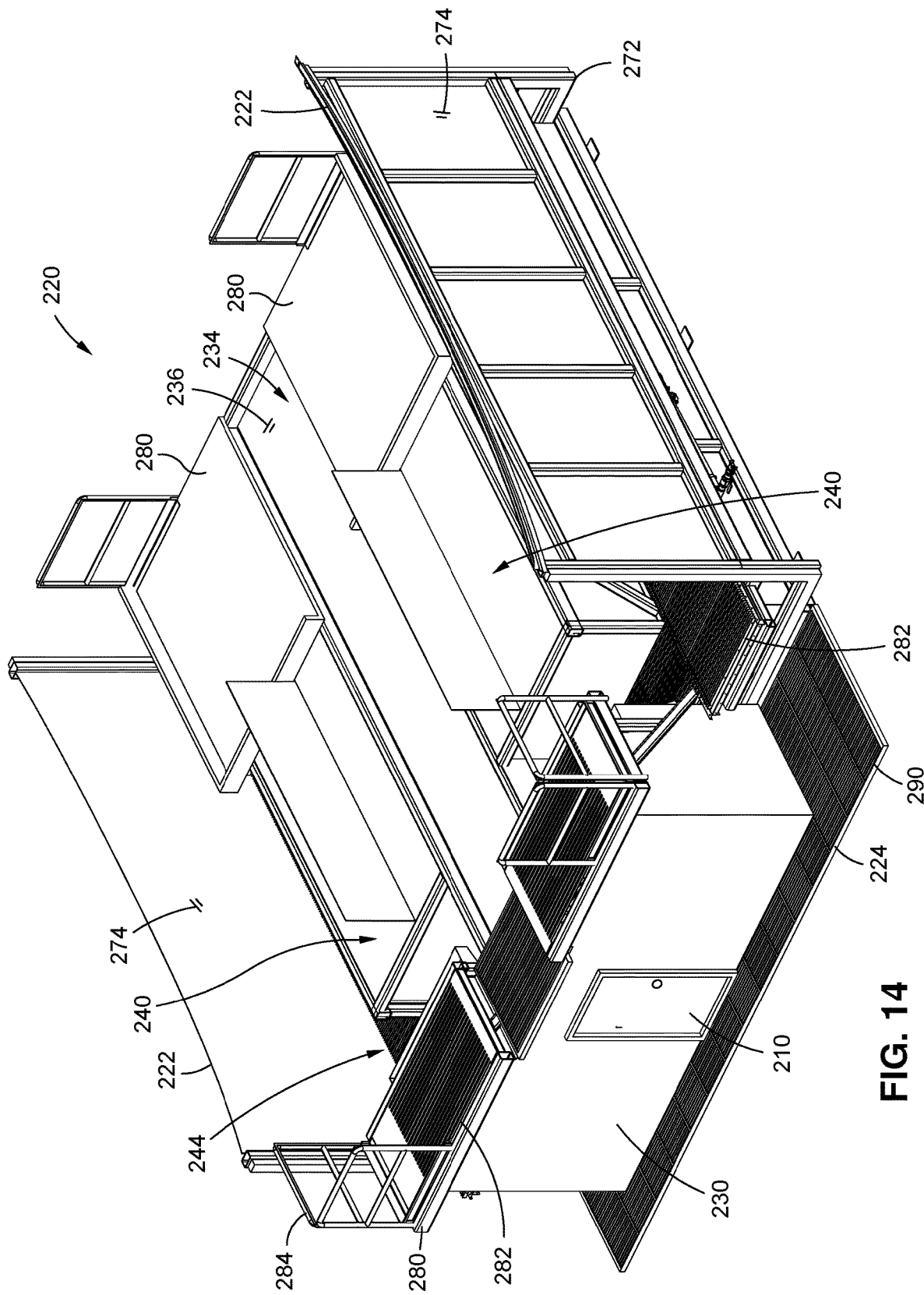
FIG. 14 is a perspective view of the forward end of the center module.
Figure 15:
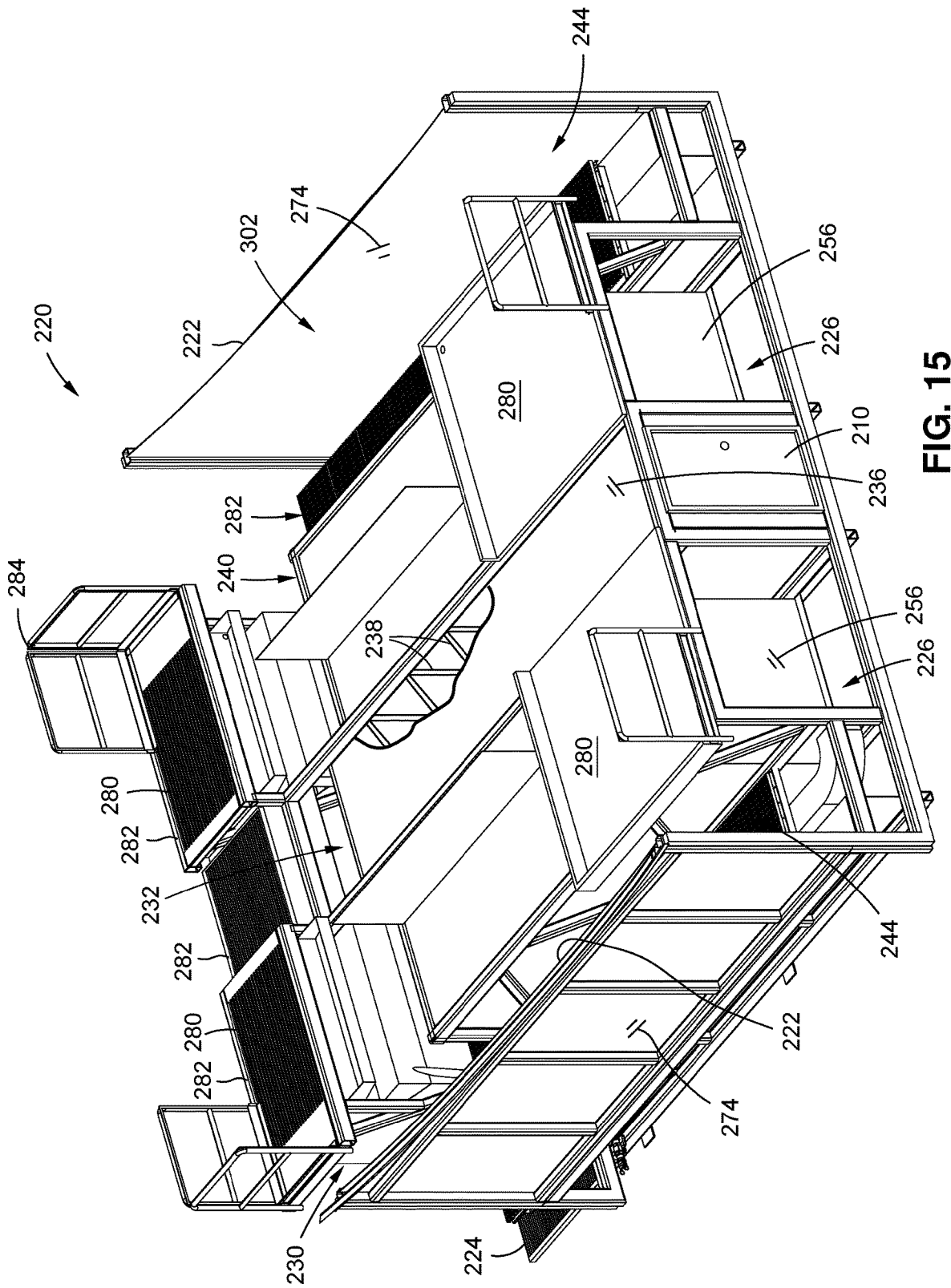
FIG. 15 is a perspective view of the aft end of the center module.

Referring to FIGS. 14-15, shown are perspective views of the center module 220 which may be constructed as a rigid frame 272 covered with module side panels 274 and module floor panels 278 (FIG. 10) in a manner similar to the above-described construction of the forward module 202. Alternatively, the center module 220 may be provided in a monocoque construction (not shown). As described above, each module side panel 274 of the center module 220 has a panel upper edge 222 configured complementary to the cross-sectional profile of the wing lower surface 148 (FIG. 10). The panel upper edge 222 may be covered with resiliently elastomeric material such as foam rubber for sealingly conforming to the wing lower surface 148 when the spray containment system 200 is assembled around the wing-body section 128 (FIG. 8).

In FIGS. 14-15, the lower level 290 of the center module 220 may be defined by the module floor panels 278 (FIG. 10). The above-mentioned plenum room 230 may be located on the lower level 290 at a forward end of the center module 220. The plenum room 230 may be configured to protrude into the forward module 202 (e.g., FIGS. 19-20) when the spray containment system 200 is in the assembled state. The plenum room 230 may have an at least partially open ceiling located directly underneath perforated work platforms 280 mounted above the plenum room 230. Such work platforms 280 may provide access for technicians to the front spar 134 (FIG. 18) and forward bulkhead 110 (FIG. 18) of the wing-body section 128 (FIG. 18). As shown in FIG. 18, the work platforms 280 mounted over the plenum room 230 may be perforated to allow air from the airflow cavities 206 of the forward module 202 (FIG. 13) to flow downwardly into the plenum room 230.

In FIGS. 14-15, the aft end of the plenum room 230 may have a generally laterally-centered plenum room opening 232 (FIG. 19) that allows air to flow into a plenum chamber 234 (FIG. 19) extending lengthwise along the center module 220. The plenum room 230 may have grated flooring 282 to allow liquid such as aqueous wash to flow into a grated drainage pan 224 serving as the floor of the plenum room 230. The grated drainage pan 224 may include one or more drain ports (not shown) for draining liquid into an external drain system (not shown) such as a below-grade catch basin (not shown) hat may be integrated into the factory sub-floor.

Referring to FIG. 15, the center module 220 may include air filters 238 housed within one or more filter housings 240 for filtering the air circulated through the internal environment 320. For example, the center module 220 may include two parallel rows of air filters 238 respectively contained within a pair of filter housings 240 separated by the plenum chamber 234. Each filter housing 240 may extend along a forward-aft direction of the center module 220. Each filter housing 240 may include one or more filter housing air inlets 242 for receiving air from the internal environment 320. In the example shown, each filter housing 240 has a filter housing air inlet 242 (FIG. 10) extending lengthwise along a side wall of the filter housing 240. The opposing side walls of the pair of filter housings 240 define the plenum chamber 234 which is covered by a plenum ceiling panel 236. As described in greater detail below, the air filters 238 in each row of each filter housing 240 may be arranged in a sawtooth pattern (FIG. 21) when the rows of air filters 238 are viewed from the side. However, the air filters 238 may be arranged in any configuration, and are not limited to the sawtooth pattern illustrated in FIG. 21.

Figure 16:
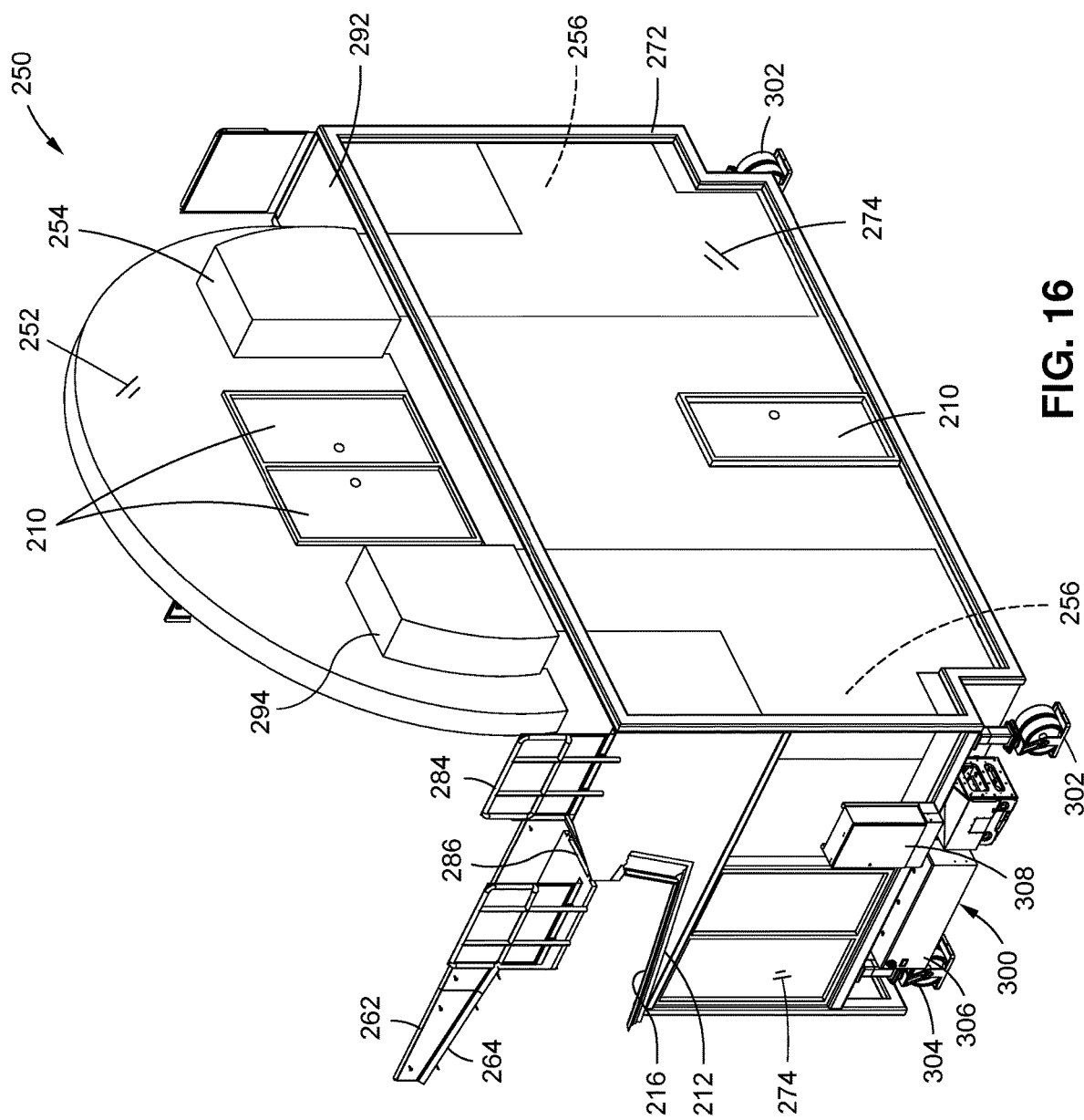
FIG. 16 is a perspective view of the aft end of the aft module.

In FIGS. 14-15, the forward end of the plenum room 230 may include a personnel door 210 to allow access by a technician to the plenum chamber 234 for removal and/or installation of the air filters 238 removably installed within the filter housings 240. Likewise, the aft end of the plenum chamber 234 may include a personnel door 210 allowing access to the plenum chamber 234 from the aft module 250 (FIG. 16). Work platforms 280 may be mounted over one or more portions of the filter housings 240 to allow technicians to access certain areas of the wing-body section 128 (FIGS. 4-6) such as the rear spar 136 (FIGS. 4-5), the keel beam 126, and the wheel wells 124 (FIGS. 4-5). The center module 220 may include passageways 244 located on laterally outboard sides of each one of the filter housings 240 and extending from the forward module 202 (FIGS. 14 and 19) to the aft module 250 (FIGS. 14 and 19). The passageways 244 may include grated flooring 282 for capturing liquid contamination that may be generated during the processing of the wing-body section 128.

Figure 20:
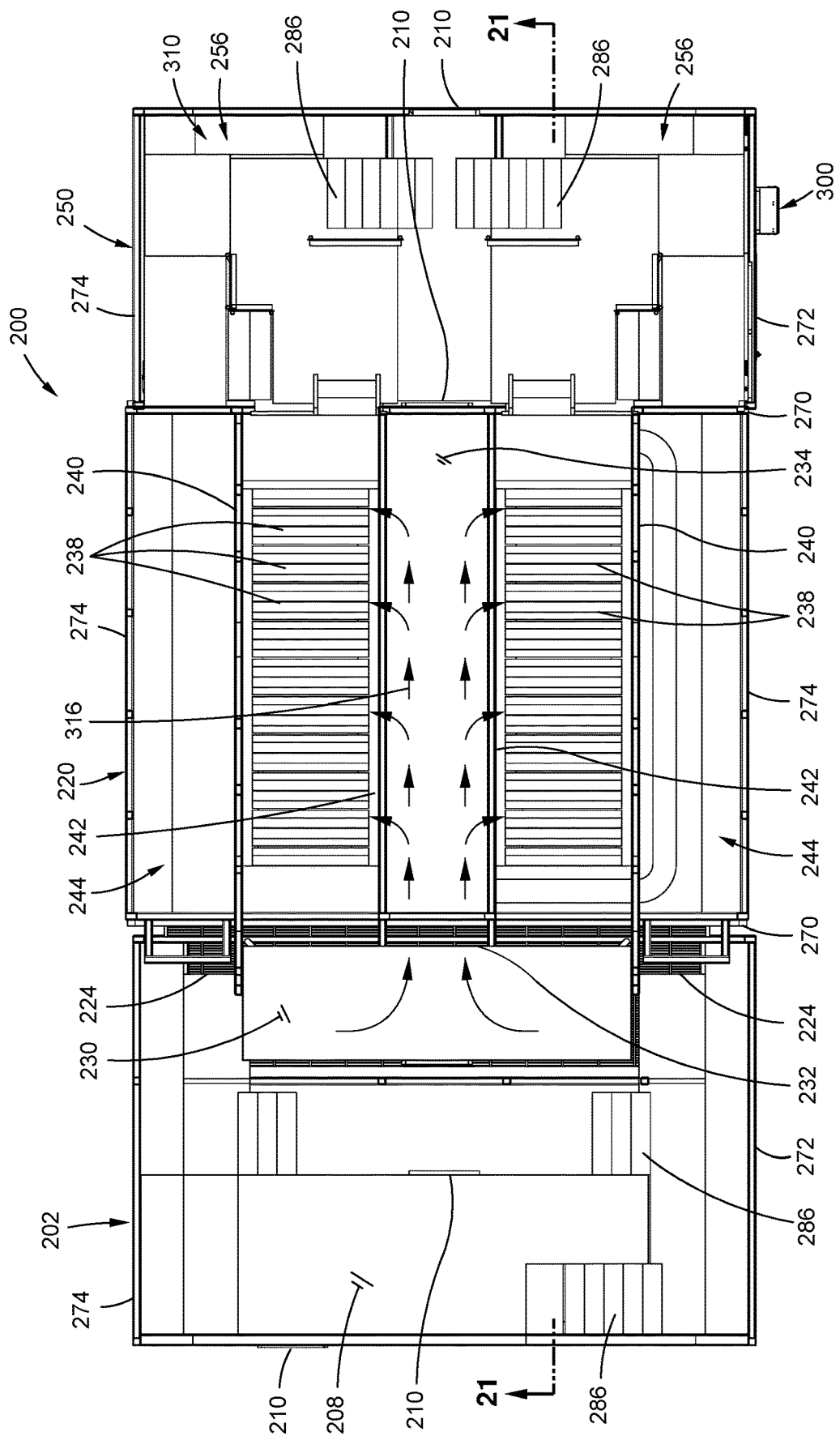
FIG. 20 is a top view of the spray containment system illustrating air flowing from the plenum room into the plenum chamber before passing into the filter housings.

In FIG. 15, the aft end of the center module 220 may include a pair of air ducts 256 respectively located at the aft end of the pair of filter housings 240. Each one of the air ducts 256 is external to the filter housings 240 and extends upwardly from one of the air intake ports 226 formed in the aft end of the module floor panel 278 of the center module 220 as shown in the above-described FIG. 10. As described below, when the spray containment system 200 is in the assembled state, each air duct 256 in the center module 220 is fluidly coupled to a corresponding air duct 256 (FIG. 17) in the below-described aft module 250. The air ducts 256 may receive air from an external duct system 312 (FIGS. 21-22) and distribute the air into the fuselage center section 104 via a pair of air inlets 254 (FIG. 17) included in the aft closeout panel 252 (FIG. 17) of the aft module 250. As described below, the airflow cavities 206 in the forward closeout panel 204 (FIG. 13) direct the air downwardly into the plenum room 230 (FIG. 18) and plenum chamber 234 (FIG. 18) for passage through the air filters 238 (FIG. 19) housed within the filter housings 240 (FIG. 20). The air from the filter housings 240 may be discharged through air exhaust ports 228 (FIG. 23) formed in the module floor panels 278 (FIG. 23) of the center module 220. The air exhaust ports 228 may be fluidly coupled to the external duct system 312 (FIGS. 21-22) for drawing the filtered air from the air exhaust ports 228.

Figure 17:
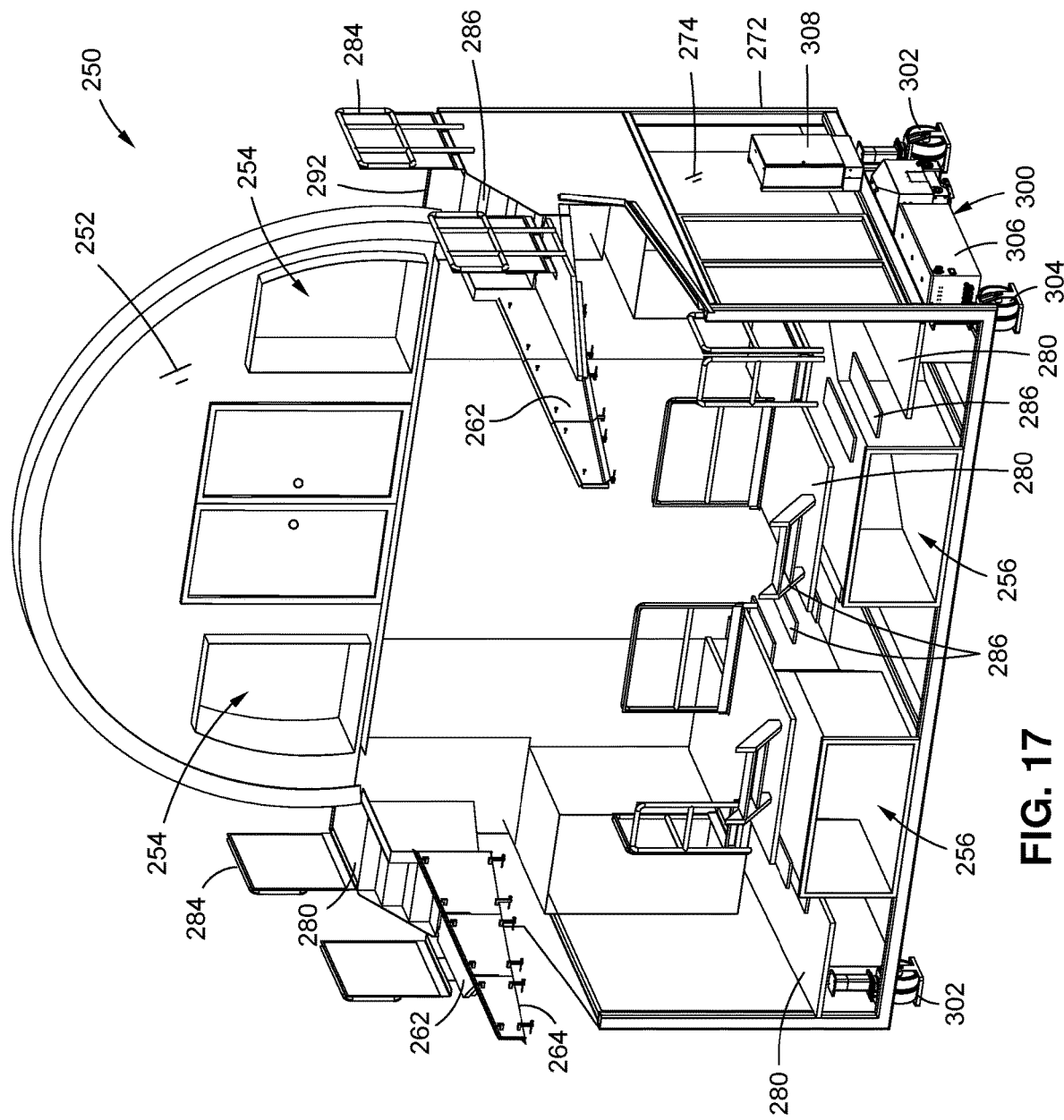
FIG. 17 is a perspective view of the forward end of the aft module.

Referring to FIGS. 16-17, shown are perspective views of the aft module 250 which may include a rigid frame 272 to which flexible or rigid impermeable module floor panels 278, module side panels 274, and/or module ceiling panels (not shown) may be removably or fixedly attached in a manner similar to the above-described construction of the forward module 202 and center module 220. Alternatively, the aft module 250 may be comprised of load-bearing panels (not shown) assembled in a monocoque construction (not shown). The aft module 250 may include wheels 302 for supporting the aft module 250 and allowing the aft module 250 to be moved along a factory floor for assembly around the wing-body section 128 prior to applying coatings to the wing-body section 128. After completion of the coating application process, at least the forward module 202 (e.g., FIG. 24) and aft module 250 (e.g., FIG. 24) may be moved away from the wing-body section 128 to allow the wing-body section 128 to be moved to the next line position (FIG. 24) and an aircraft production line 400 (FIG. 24). Similar to the above-described forward module 202, the aft module 250 may include wheels 302 located approximately at each of the four corners of the aft module 250. At least one of the wheels 302 may be a powered drive wheel 304 as part of a module drive system 300. The module drive system 300 of the aft module 250 may include a motor 306 and/or a controller 308 and may be similar in configuration and operation to the module drive system 300 of the forward module 202.

As mentioned above, the aft module 250 may include cutouts 212 formed in the module side panels 274. The cutout 212 in each module side panel 274 of the aft module 250 may be contoured complementary to the wing aft portion 142 or wing trailing edge 144 of the wings 138 for sealing the module side panel 274 to the wing. As described above with regard to the cutouts 212 of the forward module 202, the cutouts 212 in the aft module 250 may each include a cutout seal 216 formed of elastomeric or resiliently-conformable material configured to conform to the cross-sectional contour of a wing aft portion 142 or wing trailing edge 144. Each cutout seal 216 may close a gap 214 that may otherwise be formed between the cutout 212 and the wing aft portion 142 or wing trailing edge 144 when received within the cutout 212.

In FIGS. 16-17, the aft module 250 may include a seal plate 262 movably mountable to each one of the module side panels 274 for sealing the gap 214 (FIG. 10) between the cutout 212 and the wing aft portion 142 (FIG. 10) or wing trailing edge 144. As mentioned above, each seal plate 262 may be adjustably positionable or mountable relative to the module side panel 274. In addition, each seal plate 262 may have a seal plate edge that is contoured complementary to the cross-sectional profile of the wing upper surface 146 (FIG. 9) of the wing aft portion 142 or wing trailing edge 144. The seal plate edge may be lined with a seal strip 264 (FIGS. 16-17) formed of elastomeric material. The aft end of each seal plate 262 may be pivotably coupled to the module side panel 274 and may be rotatable about a horizontal axis (not shown) to allow the seal plate 262 to be pivoted upwardly to increase the size of the cutout 212 in the module side panel 274 prior receiving the wing aft portion 142 or wing trailing edge 144 as the module side panel 274 is assembled against the aft end of the wing-body section 128 (FIG. 10). Once the aft module 250 is moved into position against the wing-body section 128 such that the wing aft portion 142 or wing trailing edge 144 is received within the cutout 212 on each side of the aft module 250, the seal plates 262 may be pivoted downwardly into a generally horizontal orientation (e.g., FIG. 9) such that the seal plate lower edges seal against the wing upper surface 146.

Although the seal plates 262 are described as being pivotably coupled to the module side panels 274 of the aft module 250, the seal plates 262 may be attached to the module side panels 274 in any one a variety of different means. For example, the seal plates 262 may each be vertically translated relative to the cutout 212 as a means to increase the size of the cutout 212 to facilitate the receipt of the wing trailing edge 144 (FIG. 9) into the cutout 212 as the aft module 250 is assembled against the wing-body section 128 (FIG. 9). Furthermore, although the figures illustrate the seal plate 262 as being mounted to the upper side of cutout 212, the aft module 250 may optionally or additionally include a seal plate 262 movably coupled to the lower side of each cutout 212 for increasing the width of the cutout 212 to facilitate assembly of the aft module 250 around the wing-body section 128. Even further, although not shown, seal plates 262 may be included with the center module 220 (FIG. 11) and/or seal plates 262 may be included with the forward module 202. For example, although not shown, the forward module 202 (FIG. 11) may include movable seal plates 262 for sealing against the wing upper surface 146 or the wing lower surface 148 of the wing leading edge 140. Likewise, although not shown, the center module 220 (FIG. 11) may include movable seal plates 262 for sealing against the wing lower surfaces 148 of the wing-body section 128.

In FIG. 16-17, the aft module 250 may include stairways 286 (FIG. 17) mounted at different locations to allow technicians to access the work platforms 280 positioned at different levels. For personnel safety, handrails 284 may be provided along the perimeter edges of one or more of the work platforms 280. FIG. 17 illustrates work platforms 280 located above and adjacent to the cutout 212 on each side of the aft module 250 to allow a technician to position (e.g., pivot) the seal plate 262 into engagement with the wing upper surface 146 once the aft module 250 is assembled against the wing-body section 128 (FIG. 9). The work platforms 280 located adjacent to the seal plates 262 may also allow technicians to access localized areas of the wing upper surface 146 (FIG. 9) adjacent to the fuselage skin 118 (FIG. 9).

As shown in FIG. 17, in the interior of the aft module 250, work platforms 280 may be located above the air ducts 256 to allow technicians to access the aft bulkhead 112 (FIGS. 4-5) of the wing-body section 128. In any of the work platforms 280 located in the forward module 202, the center module 220, or the aft module 250, the work platforms 280 may optionally be perforated to allow fluid such as air and/or liquid to pass through the work platforms 280. For example, one or the more of the work platforms 280 may be provided as grated flooring 282. In some of the module floor panels 278, grated flooring 282 may be positioned on top of non-perforated module floor panels 278 to allow liquid to be collected by the module floor panels 278 for drainage of liquid to an external drain system (not shown), as mentioned above.

Figure 22:
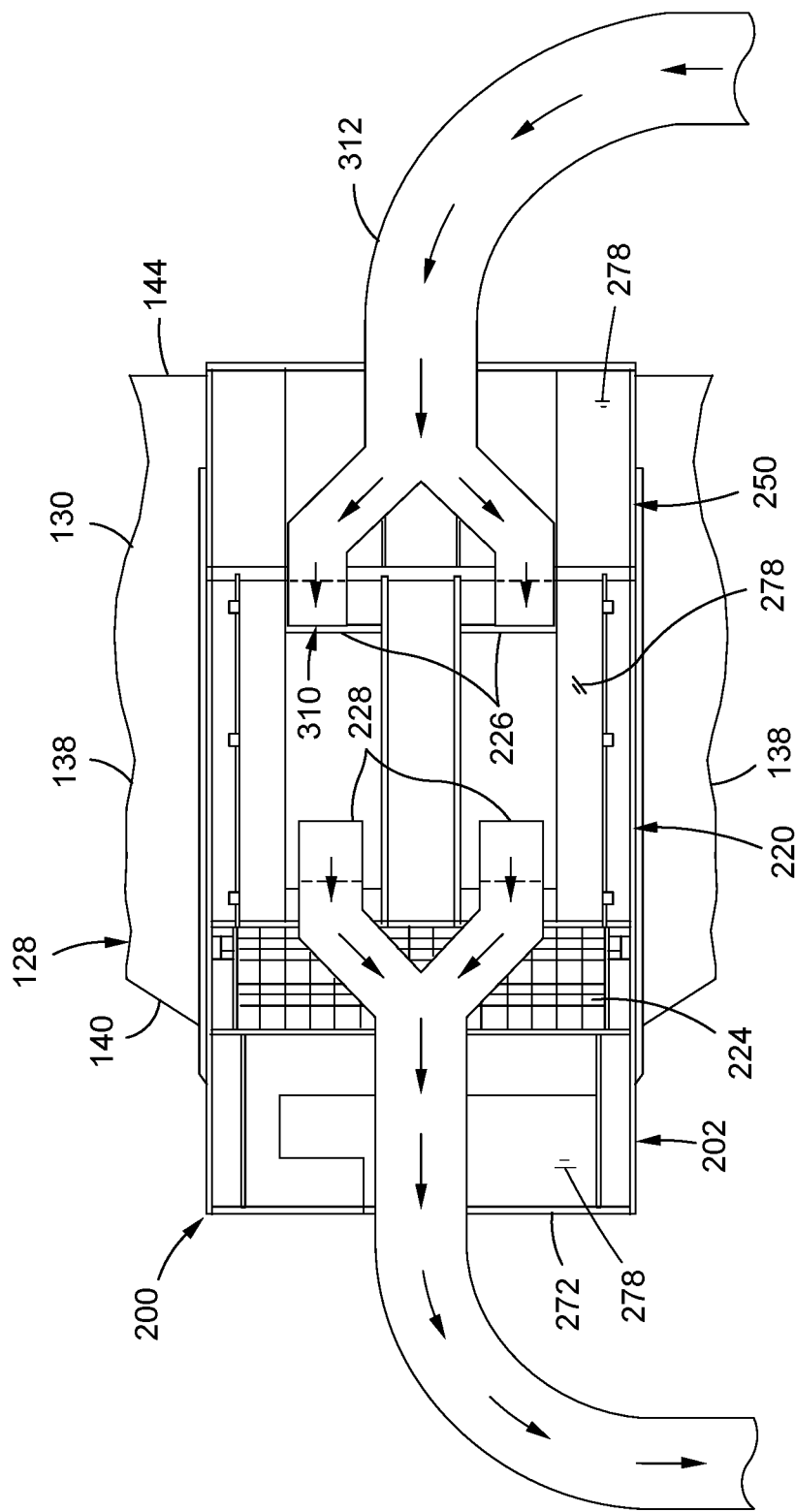
FIG. 22 is a bottom view of the spray containment system showing the flow of air from the external duct system into and out of the spray containment system.

Referring to FIGS. 16-18, as mentioned above, the spray containment system 200 includes a ventilation system 310 for circulating air through the internal environment 320 collectively enclosed by the spray containment system 200 and the wing-body section 128 (FIG. 18). The ventilation system 310 may include air intake ports 226 (FIG. 22) in the module floor panel 278 of the center module 220. The air intake ports 226 may receive air from an external duct system 312 (FIGS. 21-22). The center module 220 (FIG. 15) may include air ducts 256 (FIG. 15) which extend upwardly from the air intake ports 226 and turn horizontally in an afterward direction before terminating at the aft end of the center module 220 (FIG. 15). As shown in FIG. 17, the forward end of the aft module 250 may include air ducts 256 configured to fluidly couple with the air ducts 256 terminating at the aft end of the center module 220.

As shown in FIG. 17, the air ducts 256 may extend along the floor of the aft module 250 along a direction toward the aft end of the aft module 250, at which point the air ducts 256 may extend vertically upwardly and terminate at a pair of air inlets 254 incorporated into the aft closeout panel 252 on the upper level 292 of the aft module 250. As mentioned above, the aft closeout panel 252 may be butted up against the aft skin edge 122 (FIG. 18) of the fuselage center section 104 (FIG. 18) when the spray containment system 200 is assembled around the wing-body section 128 (FIG. 18). On the upper level 292 of the aft module 250, a personnel door 210 may be incorporated into the aft closeout panel 252. The personnel door 210 on the upper level 292 may be located between the air inlets 254 and may allow for a technician to enter and exit the aft module 250 such as from an external work stand (not shown) that may be positioned against the aft module 250 and having an upper level located at the same height as the upper level 292 of the aft module 250. On the lower level 290 of the aft module 250, a personnel door 210 may also be incorporated into the aft end to allow for technician entry and exit from the factory floor.

Referring to FIG. 18, each one of the air inlets 254 may discharge air along the first airflow direction 314 which may extend through the upper level 292 of the fuselage center section 104 between the cabin floor 114 and the fuselage skin 118. The first airflow direction 314 may be generally parallel to the aircraft longitudinal axis 116 (FIG. 3) and may extend between the aft closeout panel 252 of the aft module 250 and the forward closeout panel 204 (FIG. 11) of the forward module 202 (FIG. 11). Each one of the air inlets 254 may include a diffuser 258 for uniformly distributing the air from the air inlet 254 as a means to maximize the cross-sectional ventilation area of the fuselage center section 104. In this regard, the diffusers 258 may avoid a relatively narrow cross-sectional discharge of air that may have reduced capability for ventilating the upper level 292 of the fuselage center section 104. In FIG. 18, each diffuser 258 may include a plurality of holes, slots, louvers, or other openings 260 for uniformly distributing air discharging from the air inlet 254. Upon reaching the forward closeout panel 204 of the forward module 202, the air flowing in the first airflow direction 314 may be deflected downwardly by the pair of airflow cavities 206 incorporated in the forward closeout panel 204 as shown in FIG. 13. At the base of each one of the airflow cavities 206 (FIG. 13), a horizontal grating may be provided for supporting technicians while allowing air to flow downwardly into the plenum room (FIG. 19).

Referring to FIG. 19, the plenum room 230 has an open ceiling that is covered by perforated work platforms 280 (e.g., FIG. 18—grated flooring 282). When the spray containment system 200 is in the assembled state, the plenum room 230 of the center module 220 may protrude into the interior of the forward module 202 such that the ceiling of the plenum room 230 is located directly below the airflow cavities 206 (FIG. 17) of the forward closeout panel 204 (FIG. 17). The plenum room 230 receives the air directed downwardly by the airflow cavities 206 of the forward module 202. The air entering the plenum room 230 is directed through a generally centrally-located plenum room opening 232 on the aft end of the plenum room 230. The air from the plenum room opening 232 flows into the plenum chamber 234 which is fluidly coupled to the plenum room 230. The air flows through the plenum chamber 234 along a second airflow direction 316 which may be generally opposite the first airflow direction 314 (FIG. 18). The air flowing through the plenum chamber 234 flows into a pair of filter housings 240 located on opposite sides of the plenum chamber 234. The plenum chamber 234 is covered by a plenum ceiling panel 236.

In FIG. 19, the air from the plenum chamber 234 may enter each filter housing 240 through a filter housing air inlet 242 (FIG. 15) located on an upper portion of the side wall of each one of the filter housings 240 on each side of the plenum chamber 234. In the example shown, each filter housing air inlet 242 may be formed as an elongated slot in an upper portion of the side wall of each filter housing 240. Each one of the filter housings 240 includes a plurality of air filters 238 configured to filter the air circulated through the internal environment 320 of the spray containment system 200. The air filters 238 may be removably installed in the filter housings 240 to allow for removal and replacement of the air filters 238.

FIG. 20 is a top view of the spray containment system 200 showing air flowing from the plenum room 230 into the plenum chamber 234. The air flows through the plenum chamber 234 generally along the second airflow direction 316 and passes through the filter housing air inlets 242 and enters the filter housings 240. As shown in FIG. 20, each one of the air filters 238 is oriented generally perpendicular to the second airflow direction 316. Each one of the air filters 238 extends between the opposing lateral side walls of each filter housing 240. The air entering each filter housing air inlet 242 at the top of each filter housing 240 generally flows downwardly through the air filters 238 toward the bottom of the filter housing 240. The air may exit the internal environment 320 of the spray containment system 200 by passing through a pair of air exhaust ports 228 (FIG. 23) formed in the module floor panel 278 of the center module 220.

FIG. 21 is a side sectional view of the spray containment system 200 with the wing box 132 of the wing-body section 128 omitted for clarity and showing an example of the air circulation path through the spray containment system 200. Air may enter the air intake ports 226 from the external duct system 312. The air may pass through the air ducts 256 of the center module 220 which are fluidly coupled to air ducts 256 of the aft module 250 when the spray containment system 200 is in an assembled state. The air flows upwardly through the air ducts 256 of the aft module 250 and is discharged from the air inlets 254 incorporated into the aft closeout panel 252. As an alternative to drawing air from the external duct system 312 into the air intake ports 226 and passing through the ducts 256 before diffusing out of the air inlets 254, air ducts 256 may be omitted from the center module 220 and the aft module 250, and the air may instead be drawn directly from the external environment 322 such as through one-way vents (not shown) located at each one of the air inlets 254 on the aft closeout panel 252. Regardless of whether the air comes from the air ducts 256 or from one-way vents (not shown) formed in the aft closeout panel 252, the air exiting the air inlets 254 flows along the first airflow direction 314 through the upper level 292 of the wing-body section 128 before being deflected downwardly by the airflow cavities 206 incorporated into the forward closeout panel 204 of the forward module 202. The downwardly-deflected air flows through the open ceiling of the plenum room 230 and is directed toward a central plenum room opening (FIG. 20) which is fluidly coupled to the plenum chamber 234.

Referring still to FIG. 21, the air flows through the plenum chamber 234 along the second airflow direction 316 on the lower level 290 of the spray containment system 200. As mentioned above, the air passes through the filter housing air inlets 242 located on the sidewalls of the filter housings 240 on opposite sides of the plenum chamber 234. The air passes through the air filters 238 which filter contamination from the air prior to the air being discharged from the air exhaust ports 228 in the module floor panel 278 of the center module 220. The air exhaust ports 228 are fluidly coupled to the external duct system 312 which, in the example shown, is integrated into the factory sub-floor. In FIG. 21, the air filters 238 in each filter housing 240 may be arranged in a sawtooth configuration when the rows of air filters 238 are viewed from the side. However, the air filters 238 may be arranged in any one of a variety of different configurations, and are not limited to the sawtooth configuration.

Figure 23:
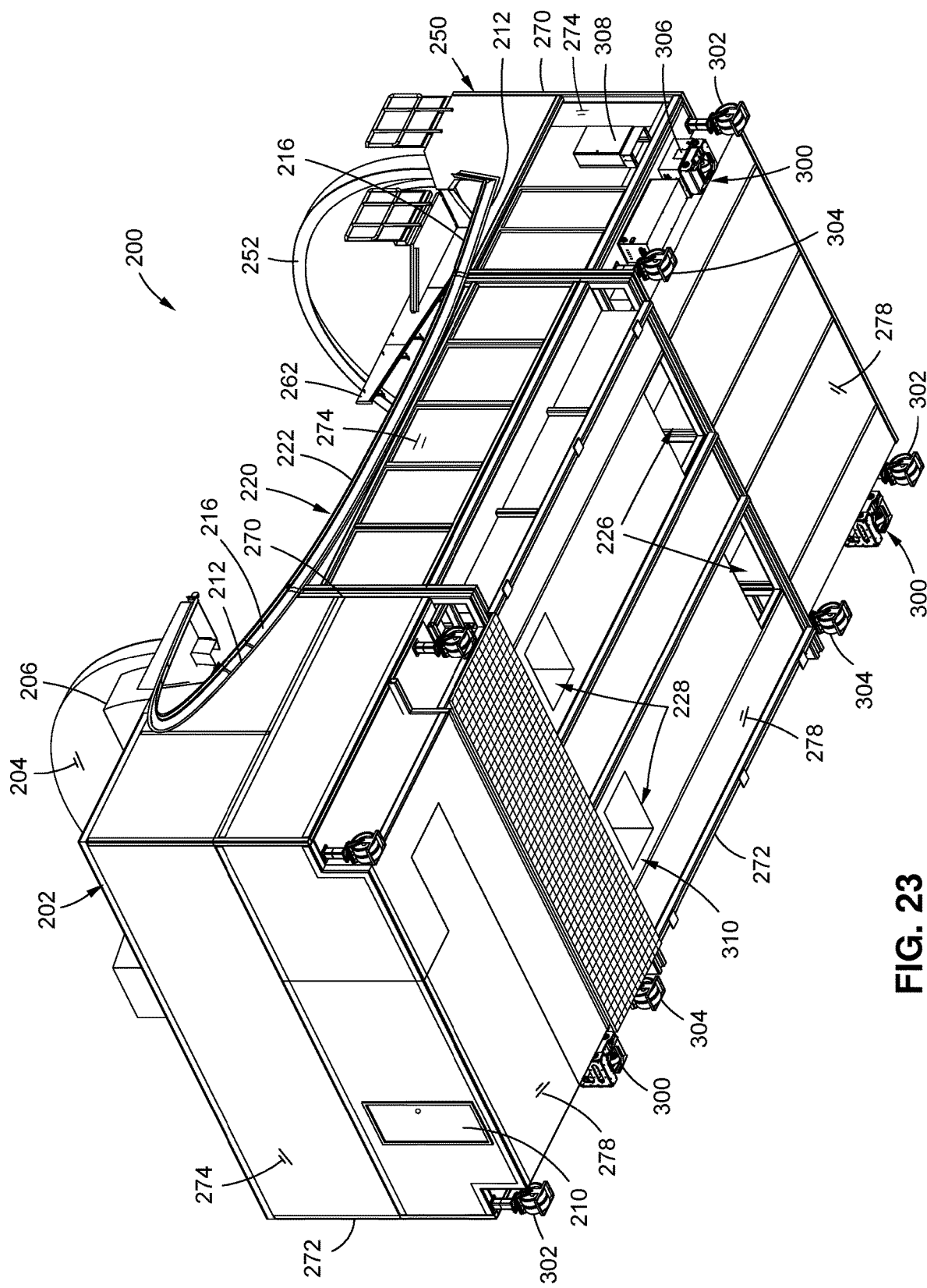
FIG. 23 is a bottom perspective view of the spray containment system.

Referring to FIGS. 22-23, shown in FIG. 22 is a bottom view of the spray containment system 200 illustrating an example of the external duct system 312 to which the ventilation system 310 of the spray containment system 200 may be fluidly coupled. As mentioned above, the ventilation system 310 may include the air intake ports 226 (FIG. 23) and the air exhaust ports 228 (FIG. 23) which, in the example shown, are formed in the module floor panels 278 of the center module 220. As mentioned above, the air intake ports 226 receive air from the external duct system 312, and the air exhaust ports 228 discharge air into the external duct system 312. Although the external duct system 312 is illustrated as a below-grade duct system, the external duct system 312 may be an above-ground duct system (not shown). An example of an above-ground duct system may draw and/or discharge air to and/or from the factory roof (not shown). It should also be noted that although the presently-disclosed spray containment system 200 has the center module 220 receiving and discharging air to the external duct system 312, the spray containment system 200 may be provided in an alternative embodiment wherein the forward module 202, the center module 220, and/or the aft module 250 or any combination thereof may be configured to be fluidly coupled to an external duct system 312 for receiving air from and/or discharging air to an external duct system 312.

In some examples, the ventilation system 310 (FIGS. 21-22) may be configured to generate negative air pressure within the internal environment 320 relative to the air pressure of the external environment 322. By maintaining negative air pressure within the internal environment 320, contaminants such as airborne or atomized chemicals are contained within the spray containment system 200, and avoid escaping to the external environment 322. Negative air pressure within the internal environment 320 of the spray containment system 200 may be maintained by discharging air from the air exhaust ports 228 (FIG. 23) at a higher flow rate than the flow rate at which air is provided to the air intake ports 226 (FIG. 23). In some examples, an exhaust fan (not shown) may be included in each one of the air exhaust ports 228 for discharging air at a higher rate than the rate at which air is drawn into the air intake ports 226. Alternatively, the external duct system 312 may include one or more exhaust fans (not shown) mounted within the external duct system 312 at a location adjacent to the air exhaust ports 228 for drawing air out of the air exhaust ports 228 at a relatively high rate. Although not shown, the ventilation system 310 may include means for providing localized air flow to areas (not shown) of the internal environment 320 that may otherwise have stagnant flow. For example, ducting (not shown) that branches off the air ducts 256 (FIG. 21) may direct air flow to one or more areas within the internal environment 320 that are located away from the main air circulation path of the first and second airflow directions 314, 316 illustrated in FIGS. 18-21. Such additional ducting (not shown) may ensure that adequate air flow is provided to the enclosed volume of the wing-body section 128.

In a further embodiment, the ventilation system 310 may include one or more air heaters (not shown) for heating the air within the internal environment 320 as a means for accelerating the curing of certain coatings. In an embodiment, the ventilation system 310 may include one or more air heaters (not shown) incorporated into the air intake ports 226, the air ducts 256, the air inlets 254 for the aft module 250, or any other location within the internal environment 320 the spray containment system 200. Alternatively, air heaters may be incorporated into the external duct system 312 such as adjacent to the air intake ports 226. Regardless of the mounting location, air heaters may be activated for heating the air in the internal environment 320 after coatings have been applied and technicians have been evacuated from the spray containment system 200. In one example, the ventilation system 310 may be configured to heat the air to a temperature of up to 130° F. or more for expedited curing of certain coatings. The heated air may be circulated in a manner described above and illustrated in FIGS. 18-22.

FIG. 24 is a plan view of an aircraft production line 400 in which the spray containment system 200 may be implemented. The aircraft production line 400 may include a plurality of manufacturing line positions 402 for manufacturing of an aircraft 100. For example, the aircraft production line 400 may include a wing-body join position 404, a coating application position 406, and a final body join position 408. In the wing-body join position 404, the wing assembly 130 comprising the wing box 132 and the wings 138 may be joined to the fuselage center section 104. In the coating application position 406, the forward module 202, the center module 220, and the aft module 250 of the presently-disclosed spray containment system 200 may be assembled around the wing-body section 128 in the above-described manner to form an internal environment 320 within which protective coatings may be applied to localized areas of the wing-body section 128. In the final body join position 408, the wing-body section 128 may be joined to remaining major components of the aircraft 100. For example, a fuselage forward section 106 may be coupled to the forward end of the fuselage center section 104, a fuselage aft section 108 may be coupled to the aft end of the fuselage center section 104, and other major components such as the empennage and the propulsion units may be joined to the aircraft 100.

Figure 25:
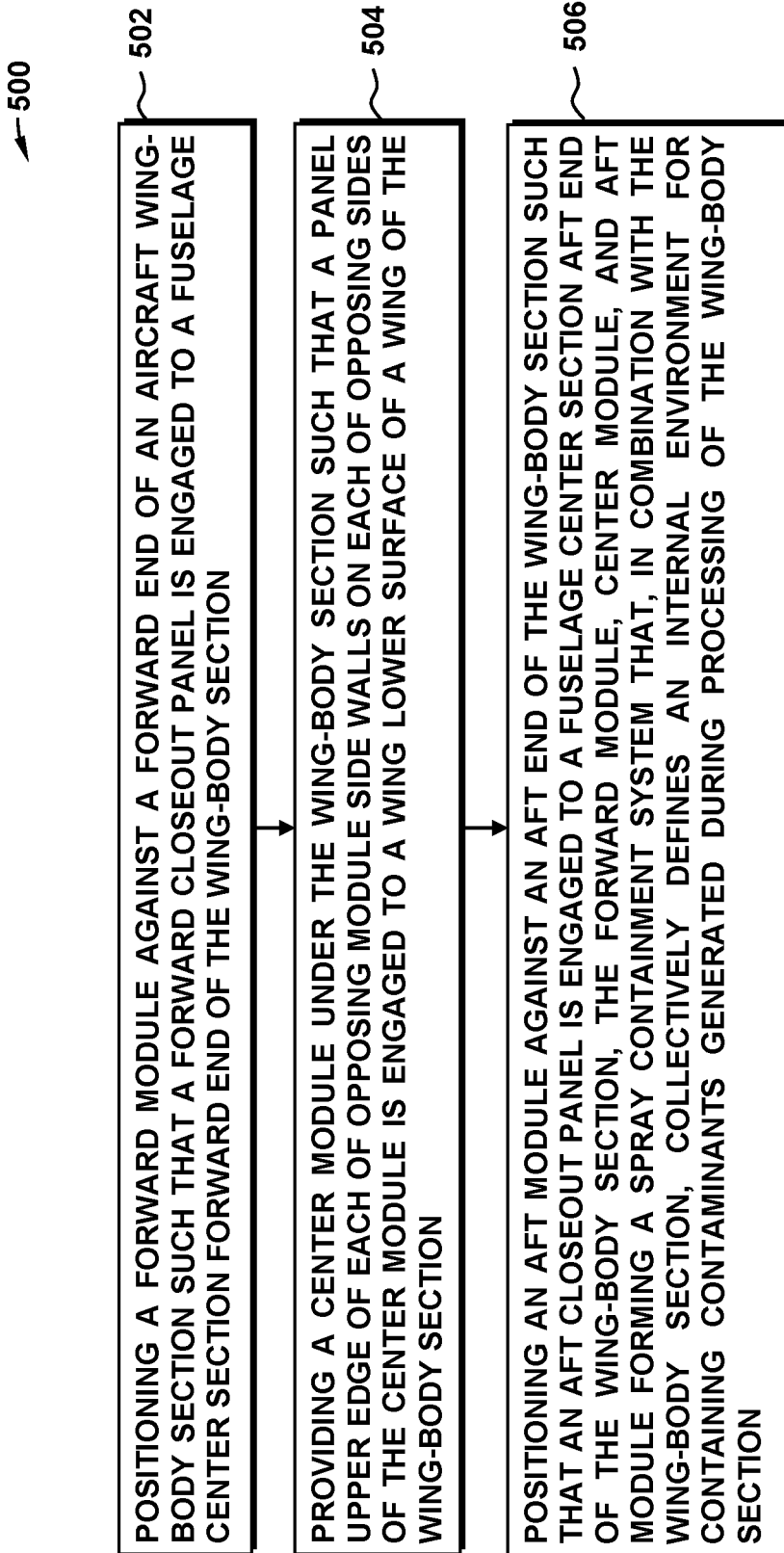
FIG. 25 is a flowchart of one or more operations included in method of containing contaminants during processing of an aircraft wing-body section.

FIG. 25 is a flowchart of one or more operations included in method 500 of containing contaminants during processing of a wing-body section 128 of an aircraft 100. Step 502 of the method 500 includes positioning the forward module 202 against the forward end of the wing-body section 128 such that the forward closeout panel 204 of the forward module 202 is engaged to the forward skin edge 120 of the fuselage skin 118 and at least partially closes off the forward end of the fuselage center section 104. In this regard, the forward closeout panel 204 may be configured to sealingly mate with the forward skin edge 120 of the fuselage skin 118. As described above and illustrated in FIG. 24, assembling the forward module 202 to the wing-body section 128 may be performed by rolling the forward module 202 on wheels 302 that may be included with the forward module 202. At least one of the wheels 302 of the forward module 202 may be a powered drive wheel 304 for motorized movement of the forward module 202, as part of a module drive system 300 described above. The module drive system 300 may include a motor 306 for driving the powered drive wheel 304 and may also include a controller 308 for controlling (e.g., via remote control) the operation of the motor and optional steering of the one or more wheels 302 of the forward module 202 to guide the forward module 202 into position relative to the center module 220 and/or relative to the wing-body section 128. Alternatively, a tug (not shown) may be used for moving the forward module 202, the aft module 250, and/or the center module 220 supported on wheels 302, as mentioned above.

Step 502 of positioning the forward module 202 against the forward end of the wing-body section 128 may include receiving the wing leading edge 140 of each one of the wings 138 within a cutout 212 formed in each of opposing module side panels 274 of the forward module 202 in a manner such that each one of the module side panels 274 is sealed to the wing 138. As mentioned above, the cutout 212 in each module side panel 274 may be contoured complementary to the wing leading edge 140 for sealing the module side panel 274 to the wing. Each one of the cutouts 212 may include a cutout seal 216 formed of elastomeric or resiliently conformable material for sealingly engaging the surfaces of the wing leading edge 140, as described above.

Step 504 of the method 500 of FIG. 24 includes providing the center module 220 under the aircraft 100 wing-body section 128 such that the panel upper edge 222 of each of opposing module side panels 274 on each of opposing sides of the center module 220 are engaged to the wing lower surface 148 of each of the pair of wings 138 of the wing-body section 128. As indicated above, the center module 220 may be stationary on the factory floor and the wing-body section 128 may be moved into position over the wing-body section 128. Alternatively, as shown in FIG. 25, the center module 220 may be configured to be movable along the factory floor and may be translated into position prior to or after the positioning of the wing-body section 128 in the coating application position 406 (FIG. 24) of an aircraft production line 400 (FIG. 24). For a movable embodiment of the center module 220, the method may include moving the center module 220 relative to the wing-body section 128 using wheels 302 supporting the center module 220. As described above for the forward module 202, at least one of the wheels 302 of the center module 220 may be a powered drive wheel 304 for directionally-controlled motorized movement of the center module 220, which may additionally include a motor 306 and controller 308 as part of the above-described module drive system 300.

Step 506 of the method 500 of FIG. 24 includes positioning the aft module 250 against an aft end of the wing-body section 128 such that the aft closeout panel 252 is engaged to the aft skin edge 122 of the fuselage skin 118 and at least partially closes off the aft end of the fuselage center section 104. In this regard, the aft closeout panel 252 may be configured to sealingly mate against the aft skin edge 122. As illustrated in FIG. 24, moving the aft module 250 may be performed by rolling the aft module 250 on wheels 302, at least one of which may be a powered drive wheel 304 for motorized movement. The aft module 250 may include the above-described module drive system 300 having a motor 306 and a controller 308 guiding the movement of the aft module 250 into position relative to the center module 220 and/or relative to the wing-body section 128. As mentioned above, the forward module 202 and the aft module 250 may be positioned against the respective forward end and aft end of the center module 220 and against the respective forward end and aft end of the wing-body section 128. In some examples, the module interface 270 between each adjoining pair of modules may include resiliently compressible material (e.g., foam, sponge rubber, etc.) for sealing the module interfaces 270.

Step 506 of positioning the aft module 250 against the wing-body section 128 may include receiving the wing aft portion 142 of each one of the wings 138 within a cutout 212 formed in each of opposing module side panels 274 of the aft module 250 in a manner such that each one of the module side panels 274 is sealed to a wing 138. The cutout 212 in each module side panel 274 of the aft module 250 may be contoured complementary to a wing aft portion 142 or wing trailing edge 144 of a respective one of the wings 138 for sealing the module side panel 274 to the wing 138. As mentioned above with regard to the forward module 202, each one of the cutouts 212 in the module side panels 274 of the aft module 250 may also include a cutout seal 216 formed of elastomeric or resiliently conformable material for sealingly engaging the surfaces of the wing aft portion 142 or wing trailing edge 144.

As mentioned above, the aft module 250 may include a movable seal plate 262 mounted or positionable above the cutout 212 on each of opposing module side panels 274 of the aft module 250. In such an arrangement, step 506 of positioning the aft module 250 against the aircraft 100 wing-body section 128 may include moving the seal plate 262 into contact with the wing aft portion 142 on each side of the aft module 250 such that the seal plate lower edge is placed in sealing engagement with the wing upper surface 146 of the wing aft portion 142. As indicated above, the seal plate lower edge may be contoured complementary to the wing upper surface 146. The seal plate lower edge of each seal plate 262 may include an elastomeric or resiliently conformable (e.g., rubber, foam) seal strip 264 configured to be placed in sealing contact with the outer mold line of the wing upper surface 146.

Steps 502, 504, 506 of respectively positioning the forward module 202, providing the center module 220, and positioning the aft module 250 may include enclosing, using the module panels 274, 276, 278 of the forward module 202, center module 220, and aft module 250, the internal environment 320 in a manner that a volume of space is defined inside and below the fuselage center section 104, and around the wing box 132, keel beam 126, wheel wells 124, and wing upper surfaces 146 and wing lower surfaces 148. As described above, when the forward module 202, center module 220, and aft module 250 of the spray containment system 200 are assembled around the wing-body section 128, the spray containment system 200 and wing-body section 128 collectively define the internal environment 320 that is sealed from the external environment 322. The spray containment system 200 is configured to contain contaminants such vapors, overspray, and/or liquids, as described above.

The method 500 may further include circulating air through the internal environment 320 using a ventilation system 310 incorporated into at least one of the forward module 202, center module 220, and aft module 250. As described above, the ventilation system 310 may include one or more air intake ports 226 and/or one or more air exhaust ports 228. In addition, the ventilation system 310 may include one or more air ducts 256 such as the air ducts 256 extending from the air exhaust ports 228 into the center module 220 and the air ducts 256 extending through the aft module 250 toward the air inlets 254 on the upper level 292 of the aft module 250. In the presently-disclosed example of the spray containment system 200, the air intake ports 226 and air exhaust ports 228 are formed in the module floor panels 278 of the center module 220. However, in another embodiment not shown, the air intake ports 226 and/or the air exhaust ports 228 may be formed in the module side panels 274 of the center module 220. In still further examples not shown, the air intake ports 226 and/or the air exhaust ports 228 may be formed in the module floor panels to 72, module side panels 274, and/or module ceiling panels 276 of the forward module 202 and/or the aft module 250. The air ducts 256 of the ventilation system 310 may extend from the air intake ports 226 to the air inlets 254 that may be incorporated into the forward module 202 or the aft module 250.

The step of circulating air through the internal environment 320 may include providing air to the ventilation system 310 using an external duct system 312 (FIG. 21), and exhausting the air from the internal environment 320 to the external duct system 312. As shown in FIGS. 21-22, the air intake ports 226 and air exhaust ports 228 of the center module 220 are fluidly coupled to the external duct system 312 which is shown as a below-grade external duct system 312. However, in other examples of the spray containment system 200 not shown, the forward module 202, the center module 220, and/or the aft module 250 may be configured to be fluidly coupled to the external duct system 312 for providing and exhausting air from the ventilation system 310. In addition, the external duct system 312 may be configured to exhaust air to a factory roof (not shown).

The circulating of air through the internal environment 320 may include discharging the air into the internal environment 320 from one or more air inlets 254 such as the pair of air inlets 254 incorporated into the aft closeout panel 252 of the aft module 250 as described above. In the arrangement shown, the air inlets 254 are configured to discharge air into the upper level 292 of the fuselage center section 104. As a result of the location of the air inlets 254, the method may include directing the air from the air inlets 254 along the first airflow direction 314 (FIG. 18) generally parallel to the aircraft longitudinal axis 116 (FIG. 3) and through the upper level 292 of the fuselage center section 104. In addition, the method may include receiving the air flowing in the first airflow direction 314 at one or more airflow cavities 206 such as the pair of airflow cavities 206 (FIG. 13) incorporated into the forward closeout panel 204 of the forward module 202. Furthermore, the method may include directing, using the one or more airflow cavities 206, the air downwardly to a location below the cabin floor 114 and along the second airflow direction 316 (FIGS. 19-20). The second airflow direction 316 may be generally opposite the first airflow direction 314.

It should be noted that although the figures illustrate air flowing along the upper level 292 in the first airflow direction 314 from the aft module 250 toward the forward module 202, and along the lower level 290 in the second airflow direction 316 from the forward module generally toward the aft module, the ventilation system 310 may be provided in alternative embodiments. For example, in an embodiment not shown, the ventilation system 310 may be configured in an embodiment such that air is discharged from air inlets 254 incorporated into the forward closeout panel of the forward module 202 and flows along the upper level 292 in the first airflow direction 314 from the forward module 202 toward the aft module 250, before being deflected downwardly by airflow cavities 206 incorporated into the aft closeout panel 252 of the aft module 250, and then flowing along the lower level 290 in the second airflow direction 316 from the aft module 250 generally toward the forward module 202.

The circulating of air through the internal environment 320 may further include generating negative air pressure within the internal environment 320 relative to the air pressure in the external environment 322. For example, as mentioned above, the ventilation system 310 may configured to discharge air at a higher flow rate than the flow rate at which air is provided to the air inlet 254 of the spray containment system 200. Negative pressure may be generated within the internal environment 320 by including exhaust fans or other air-moving devices in the air exhaust ports 228 and/or in the external duct system 312 for drawing air out of the internal environment 320 at a higher flow rate than the flow rate at which air is provided to the internal environment 320.

The circulating of air through the internal environment 320 may include filtering the air circulating through the internal environment 320 using a plurality of air filters 238. As mentioned above, the air filters 238 may be configured to filter contaminants in the air. In the illustrated example of the spray containment system 200, the air filters 238 may be removably installed in the center module 220. FIGS. 19-21 illustrate passing the air through two parallel rows of air filters 238 respectively contained within a pair of filter housings 240 located in the center module 220, as described above. Prior to entering the filter housings 240, the air may be directed along the second airflow direction 316 through the plenum chamber 234 located between the pair of filter housings 240. However, in alternative embodiments not shown, air filters 238 may be incorporated into the forward module 202, the center module 220, and/or the aft module 250, and are not limited to being installed in the center module 220 in the arrangement shown in the figures.

Many modifications and other configurations of the disclosure will come to mind to one skilled in the art, to which this disclosure pertains, having the benefit of the teachings presented in the foregoing descriptions and the associated drawings. The configurations described herein are meant to be illustrative and are not intended to be limiting or exhaustive. Although specific terms are employed herein, they are used in a generic and descriptive sense only and not for purposes of limitation.

What is claimed is:

1. A spray containment system for a wing-body section of an aircraft, the wing-body section comprising a wing assembly including a pair of wings joined to a fuselage center section having an aircraft longitudinal axis, the spray containment system comprising:
   a forward module having a forward closeout panel configured to engage and at least partially close off a fuselage center section forward end;
   a center module having opposing module side panels on each of opposing sides of the center module, each module side panel having a panel upper edge configured to engage a wing lower surface of a wing of the wing-body section;
   an aft module having an aft closeout panel configured to engage and at least partially close off a fuselage center section aft end; and
   at least the forward module and the aft module being independently movable and configured to be assembled around the wing-body section to define an internal environment that is sealed from an external environment for containing contaminants including at least one of vapors, overspray, and liquids generated during application of one or more of coatings, sealants, and adhesives to localized areas of the wing-body section.

2. The spray containment system of claim 1, wherein:
   the forward module and the aft module each include module side panels, each of the module side panels of at least one of the forward module and the aft module has a cutout;
   the cutout in each module side panel of the forward module is contoured complementary to a wing leading edge for sealing the module side panel to the wing; and
   the cutout in each module side panel of the aft module is contoured complementary to a wing aft portion of a respective one of the wings for sealing the module side panel to the wing.

3. The spray containment system of claim 2, wherein:
   the cutout in the module side panels of at least one of the forward module and the aft module is sized and configured to provide a gap relative to the respective wing leading edge and the wing aft portion; and
   at least one of the forward module and aft module includes a movable seal plate mountable to each of the module side panels for sealing the gap between the cutout and the respective wing leading edge and the wing aft portion.

4. The spray containment system of claim 2, wherein:
   each cutout has a cutout seal formed of resiliently conformable material for sealingly engaging the wing.

5. The spray containment system of claim 4, wherein:
   the resiliently conformable material is one of foam, foam rubber, or silicone.

6. The spray containment system of claim 1, further including:
   a ventilation system incorporated into at least one of the forward module, center module, and aft module for circulating air through the internal environment collectively defined by the spray containment system and the wing-body section.

7. The spray containment system of claim 6, wherein:
   the ventilation system is configured to generate negative air pressure within the internal environment relative to air pressure external to the spray containment system.

8. The spray containment system of claim 6, wherein the ventilation system includes:
- a plurality of air filters removably installed in at least one of the forward module, center module, and aft module, and configured to filter the air circulating through the internal environment.

9. The spray containment system of claim 8, wherein:
the center module includes a pair of filter housings each containing a row of the air filters.

10. The spray containment system of claim 9, wherein:
the center module includes a plenum chamber located on at least one of opposing ends of the center module, the plenum chamber separating the pair of filter housings.

11. The spray containment system of claim 6, wherein the ventilation system includes:
- at least one air inlet located on an upper level of the fuselage center section at least one of the forward module and the aft module and configured to discharge air along a first airflow direction generally parallel to the aircraft longitudinal axis through the upper level above a cabin floor of the fuselage center section; and
- at least one airflow cavity included in a remaining one of the forward module and aft module, the airflow cavity configured to receive the air flowing along the upper level in the first airflow direction, and direct the air downwardly below the cabin floor and into a lower level for movement along a second airflow direction opposite the first airflow direction.

12. The spray containment system of claim 11, wherein:
the at least one air inlet comprises a pair of air inlets located on the upper level of the fuselage center section of at least one of the forward module and the aft module; and
the at least one airflow cavity comprises a pair of airflow cavities in the remaining one of the forward module and the aft module.

13. The spray containment system of claim 11, wherein the ventilation system includes:
- a diffuser in at least one of the forward module, the center module, and the aft module, the diffuser fluidly configured to receive air from the external environment and uniformly distribute the air from the air inlet into the upper level.

14. The spray containment system of claim 11, wherein:
at least one of the forward module, the center module, and the aft module is configured to be fluidly coupled to an external duct system for providing air to the ventilation system and exhausting air from the ventilation system.

15. The spray containment system of claim 1, wherein:
at least one of the forward module, center module, and aft module are supported on wheels facilitating movement of the forward module, center module, and aft module.

16. The spray containment system of claim 15, wherein:
at least one of the wheels of at least one of the forward module, center module, and aft module is a powered drive wheel.

17. The spray containment system of claim 1, wherein:
the internal environment includes a volume of space below the fuselage center section when the forward module, center module, and aft module are assembled around the wing-body section.

18. The spray containment system of claim 1, further comprising:
an air heater for heating the air within the internal environment.

19. The spray containment system of claim 1, wherein:
at least one of the forward module, the center module, and the aft module includes a work platform.

20. The spray containment system of claim 1, wherein:
at least one of the forward module and the aft module includes a changing room.

21. An aircraft production line, comprising:
a plurality of aircraft manufacturing line positions for manufacturing of an aircraft and including a coating application position having a spray containment system for an aircraft wing-body section comprising a wing assembly including a pair of wings joined to a fuselage center section having an aircraft longitudinal axis, the spray containment system including:
a forward module having a forward closeout panel configured to engage and at least partially close off a fuselage center section forward end;
a center module having opposing module side panels on each of opposing sides of the center module, each module side panel having a panel upper edge configured to engage a wing lower surface a wing of the pair of wings of the wing-body section;
an aft module having an aft closeout panel configured to engage and at least partially close off a fuselage center section aft end; and
the forward module and the aft module being independently movable and configured to be assembled around the wing-body section to define an internal environment that is sealed from an external environment for containing contaminants including at least one of vapors, overspray, and liquids generated during application of one or more of coatings, sealants, and adhesives to localized areas of the wing-body section.

* * * * *